United States Patent
Cao et al.

(10) Patent No.: US 10,911,281 B2
(45) Date of Patent: Feb. 2, 2021

(54) SYSTEM AND METHOD FOR PILOT SIGNAL TRANSMISSION

(71) Applicant: Huawei Technologies Co., Ltd., Shenzhen (CN)

(72) Inventors: Yu Cao, Ottawa (CA); Hosein Nikopour, San Jose, CA (US); Alireza Bayesteh, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 59 days.

(21) Appl. No.: 15/290,652

(22) Filed: Oct. 11, 2016

(65) Prior Publication Data

US 2017/0111147 A1   Apr. 20, 2017

Related U.S. Application Data

(60) Provisional application No. 62/243,986, filed on Oct. 20, 2015.

(51) Int. Cl.
*H04L 5/00* (2006.01)
*H04L 27/20* (2006.01)
(Continued)

(52) U.S. Cl.
CPC ........ *H04L 27/2613* (2013.01); *H04L 5/0051* (2013.01)

(58) Field of Classification Search
CPC ..... H04W 80/04; H04W 88/06; H04W 88/08; H04W 84/18; H04W 29/06
See application file for complete search history.

(56) References Cited

U.S. PATENT DOCUMENTS 7,426,175 B2 * 9/2008 Zhuang .................... H04B 1/69
                                                          370/203
7,480,339 B2 * 1/2009 Hwang ................ H04L 1/0069
                                                          375/267
(Continued)

FOREIGN PATENT DOCUMENTS

| CN | 1934812 A | 3/2007 |
|---|---|---|
| CN | 104967582 A | 10/2015 |
| WO | 2014198346 A1 | 12/2014 |

OTHER PUBLICATIONS

3rd Generation Partnership Project; Technical Specification Group Radio Access Network; Evolved Universal Terrestrial Radio Access (E-UTRA); Physical channels and modulation (Release 12), 3GPP TS 36.211 v12.5.0 (Mar. 2015), 136 pages.
(Continued)

*Primary Examiner* — Peter G Solinsky
*Assistant Examiner* — Sanjay K Dewan
(74) *Attorney, Agent, or Firm* — Slater Matsil, LLP

(57) ABSTRACT

Longer pilot sequences can be supported by transmitting pilot values of a given pilot sequence over different orthogonal frequency division multiplexed (OFDM) symbols of an uplink frame. The pilot values may be contiguous, or non-contiguous, with one another in the time domain. Consecutive pilot values in a pilot sequence may be transmitted in different OFDM symbols of the frame. For example, odd pilot values (e.g., $P_1, P_3, P_5 \ldots$) in a pilot sequence may be transmitted over a different OFDM symbol than even pilot values (e.g., $P_2, P_4, P_6 \ldots$) in the pilot sequence. Alternatively, a leading subset of pilot values in a pilot sequence is transmitted over a different OFDM symbol than a trailing subset of pilot values in the pilot sequence.

33 Claims, 17 Drawing Sheets

(51) Int. Cl.
*H04W 74/00* (2009.01)
*H04L 27/26* (2006.01)

(56) References Cited

U.S. PATENT DOCUMENTS

| | | | | |
|---|---|---|---|---|
| 7,668,251 | B2* | 2/2010 | Magee | H04B 7/02 |
| | | | | 375/260 |
| 7,929,416 | B2* | 4/2011 | Papasakellariou | |
| | | | | H04L 25/0226 |
| | | | | 370/208 |
| 8,111,763 | B2* | 2/2012 | Ma | H04L 5/0016 |
| | | | | 375/260 |
| 8,559,295 | B2* | 10/2013 | Thomas | H04B 7/0678 |
| | | | | 370/208 |
| 8,675,749 | B2* | 3/2014 | Khoshgard | H04L 27/2647 |
| | | | | 375/260 |
| 9,391,818 | B1* | 7/2016 | Rao | H04L 25/0226 |
| 9,615,384 | B2* | 4/2017 | Ashikhmin | H04B 7/0417 |
| 9,743,423 | B2* | 8/2017 | Liu | H04W 72/1268 |
| 2005/0084000 | A1* | 4/2005 | Krauss | H04L 25/0232 |
| | | | | 375/148 |
| 2005/0094550 | A1* | 5/2005 | Huh | H04L 5/0007 |
| | | | | 370/203 |
| 2005/0226140 | A1* | 10/2005 | Zhuang | H04L 27/2613 |
| | | | | 370/203 |
| 2006/0209978 | A1* | 9/2006 | Jungnickel | H04B 7/0413 |
| | | | | 375/267 |
| 2007/0177553 | A1* | 8/2007 | Frederiksen | H04L 27/2608 |
| | | | | 370/335 |
| 2007/0217531 | A1* | 9/2007 | Kwon | H04L 5/0007 |
| | | | | 375/260 |
| 2008/0310530 | A1* | 12/2008 | Imamura | H04L 5/0048 |
| | | | | 375/260 |
| 2010/0142634 | A1* | 6/2010 | Filippi | H04L 27/261 |
| | | | | 375/260 |
| 2010/0254470 | A1* | 10/2010 | Kim | H04L 5/0023 |
| | | | | 375/260 |
| 2011/0026482 | A1* | 2/2011 | Li | H04L 5/0048 |
| | | | | 370/329 |
| 2011/0176581 | A1* | 7/2011 | Thomas | H04B 1/7075 |
| | | | | 375/146 |
| 2011/0293050 | A1* | 12/2011 | Khoshgard | H04L 27/2647 |
| | | | | 375/346 |
| 2012/0120907 | A1* | 5/2012 | Kishigami | H04B 7/0697 |
| | | | | 370/329 |
| 2012/0257566 | A1* | 10/2012 | Le | H04L 45/308 |
| | | | | 370/328 |
| 2013/0089163 | A1* | 4/2013 | Zhang | H04L 5/0048 |
| | | | | 375/295 |
| 2013/0315323 | A1* | 11/2013 | Porat | H04L 5/0048 |
| | | | | 375/260 |
| 2014/0254697 | A1* | 9/2014 | Zhang | H04L 5/0094 |
| | | | | 375/260 |
| 2014/0286455 | A1* | 9/2014 | Choi | H04L 5/0048 |
| | | | | 375/308 |
| 2014/0362832 | A1* | 12/2014 | Rudolf | H04L 1/1822 |
| | | | | 370/336 |
| 2016/0020865 | A1* | 1/2016 | Byoung-Hoon | H04B 7/0671 |
| | | | | 370/335 |
| 2016/0056934 | A1* | 2/2016 | Li | H04L 5/0048 |
| | | | | 370/330 |
| 2016/0353453 | A1* | 12/2016 | Au | H04W 74/006 |
| 2017/0019283 | A1* | 1/2017 | Zhang | H04L 5/0051 |
| 2017/0063569 | A1* | 3/2017 | Currivan | H04B 3/46 |
| 2017/0195159 | A1* | 7/2017 | Lee | H04L 25/0224 |
| 2017/0214506 | A1* | 7/2017 | Lee | H04L 5/0048 |
| 2018/0041988 | A1* | 2/2018 | Lee | H04W 56/00 |

OTHER PUBLICATIONS

Brian Kelley et al., "Cognitive Interference Avoidance in 4th Generation GPS," System of Systems Engineering Conference, 2015, pp. 410-415.

Yuejie Chi et al.,"Training Signal Design and Tradeoffs for Spectrally-Efficient Multi-User MIMO-OFDM Systems," IEEE Transactions on Wireless Communications, vol. 10, No. 7, Jul. 2011, pp. 2234-2245.

Yuejie Chi et.,"MMSE-Optimal Training Sequences for Spectrally-Efficient Multi-User MIMO-OFDM Systems," 19th European Signal Processing Conference (EUSIPCO 2011), Barcelona, Spain, Aug. 29-Sep. 2, 2011, pp. 634-638.

* cited by examiner

SYSTEM AND METHOD FOR PILOT SIGNAL TRANSMISSION

This patent application claims priority to U.S. Provisional Application No. 62/243,986, filed on Oct. 20, 2015 and entitled "System and Method for Pilot Signal Transmission," which is hereby incorporated by reference herein as if reproduced in its entirety.

TECHNICAL FIELD

The present invention relates to a system and method for wireless communications, and, in particular embodiments, to a system and method for system and method for pilot signal transmission.

BACKGROUND

Multiple access schemes allow different user equipments (UEs) to access resources of the same channel. Grant-based multiple access schemes schedule resources of a channel to UEs. In contrast, grant-free multiple access schemes allow the UEs to access the resources in a contention-based manner without the resources being scheduled to the specific UE. When used to access uplink resources, grant-free multiple access schemes may reduce both latency and overhead when compared to grant-based multiple access schemes. However, a collision may occur when two UEs try to access the same uplink resource. The collision may prevent the base station from receiving one or both uplink transmissions, thereby requiring a retransmission by one or both UEs.

SUMMARY

Technical advantages are generally achieved by embodiments of this disclosure which describe systems and methods for pilot signal transmission.

In accordance with an embodiment, a method for grant-free uplink contention-based transmission is provided. In this example, the method includes selecting a pilot sequence from a pool of pilot sequences. The pilot sequence includes a sequence of pilot values. The method further includes transmitting pilot values in the pilot sequence over at least two OFDM symbols in an uplink frame, at least a first subset of pilot values in the sequence of pilot values being transmitted in one of the at least two OFDM symbols and at least a second, distinct subset of the pilot values in the sequence of pilot symbols being transmitted in another one of the at least two OFDM symbols. An apparatus for performing this method is also provided.

In accordance with another embodiment, a method for grant-free uplink contention-based transmission is provided. In this example, the method includes transmitting consecutive pilot values of a pilot sequence over consecutive sub-band frequencies in a first OFDM symbol of an uplink frame, applying a phase shift to every second pilot value in the pilot sequence to obtain a phase-shifted pilot sequence, and transmitting consecutive pilot values in the phase-shifted pilot sequence over the consecutive sub-band frequencies in a second OFDM symbol of the uplink frame. An apparatus for performing this method is also provided.

In accordance with another embodiment, a method for receiving uplink transmissions is provided. In this example, the method includes receiving an uplink frame carrying a first pilot sequence transmission by a first user equipment (UE) and a second pilot sequence transmission by a second UE. Pilot values of the first pilot sequence transmission are received over different sub-band frequencies of a first orthogonal frequency division multiplexed (OFDM) symbol in the uplink frame than pilot values of the second pilot sequence transmission. An apparatus for performing this method is also provided.

In accordance with another embodiment, a method for performing an uplink transmission is provided. In this example, the method includes transmitting data values over a subset of sub-band frequencies in an uplink frame, and transmitting a pilot sequence in the uplink frame. A first subset of pilot values in the pilot sequence are transmitted over a first orthogonal frequency division multiplexed (OFDM) symbol of the uplink frame and a second subset of pilot values in the pilot sequence are transmitted over a second OFDM symbol of the uplink frame. The first subset of pilot values and the second subset of pilot values are transmitted over different sub-band frequencies in the subset of sub-band frequencies over which the data values are transmitted. An apparatus for performing this method is also provided.

In accordance with another embodiment, another method for receiving uplink transmissions is provided. In this example, the method includes receiving an uplink frame carrying a first pilot sequence transmission by a first user equipment (UE) and a second pilot sequence transmission by a second UE. Pilot values in the first pilot sequence transmission are received over a different orthogonal frequency division multiplexed (OFDM) symbol than pilot values of the second pilot sequence transmission. An apparatus for performing this method is also provided.

BRIEF DESCRIPTION OF THE DRAWINGS

For a more complete understanding of the present invention, and the advantages thereof, reference is now made to the following description taken in conjunction with the accompanying drawings, in which.

DETAILED DESCRIPTION OF ILLUSTRATIVE EMBODIMENTS

Figure 1:
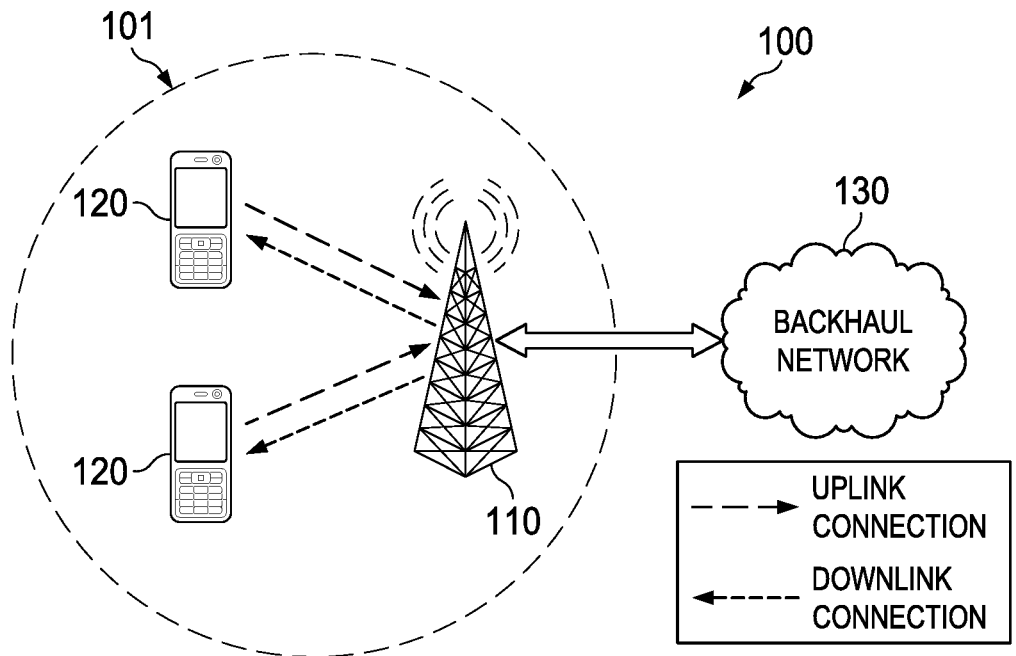
FIG. 1 is a diagram of an embodiment wireless communications network.

The structure, manufacture and use of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention. As discussed herein, the term "pilot sequence" refers to any sequence of two or more values, such as complex values, for transmission as a pilot signal. Although many embodiments provided herein are described in the context of grant-free access schemes, it should be appreciated that those embodiments are equally applicable to grant-based access schemes.

Various multiple access schemes have been proposed for grant-free uplink transmission in $5^{th}$ Generation (5G) telecommunications in order to increase channel capacity. One such scheme is Sparse Code Multiple Access (SCMA), which is a non-orthogonal multiple-access technique that transmits multiple data streams over a set of sub-carrier frequencies using non-orthogonal spreading sequences. Although much of this disclosure discusses SMCA, it should be appreciated that embodiments described herein are also applicable to other multiple-access schemes. Because SCMA transmissions are non-orthogonal to one another, an SCMA receiver may generally need to have a relatively good estimate of the air interface in order to successfully decode received SCMA transmissions based on a non-orthogonal signal processing technique, such as an iterative message passing algorithm (MPA).

Channel estimation may be performed based on pilot signals received from each UE. A set of consecutive values used for a pilot signal (e.g., $P_1, P_2, \ldots P_N$) is referred to as a pilot sequence. UEs will generally transmit one or more instances of a pilot sequence in a given uplink frame. By way of example, in 4G LTE, UEs generally transmit a length-48 pilot sequence in one OFDM symbol of an uplink frame, and then retransmit the same length-48 pilot sequence in another pilot sequence of the frame.

To mitigate interference between pilot sequence transmissions from different UEs, the UEs may select pilot sequences from a pool of pilot sequences. The pilot sequence selection may be random or based on a predefined selection rule. The pool of pilot sequences may be formed by modifying a root sequence in a manner that mitigates cross-correlation between generated pilot sequences. By way of example, a pool of pilot sequences may be generated by cyclically shifting a root Zadoff-Chu sequence. The average cross-correlation between pilot sequences in a pool is largely dependent on the length of the root sequence. Because many UEs may access the same uplink channel in next-generation networks, there is a need for frame formats that carry longer pilot sequences in order to support uplink grant-free multiple access transmission schemes for 5G.

Embodiments of this disclosure provide new frame formats that support longer pilot sequences, as well as schemes that allow for shorter pilot sequences (e.g., length-48 sequences) to support higher number of UEs. In some embodiments, longer pilot sequences are supported by transmitting pilot values of a given pilot sequence over different orthogonal frequency division multiplexed (OFDM) symbols of an uplink frame. The OFDM symbols over which the pilot values are transmitted may be contiguous, or non-contiguous, with one another in the time domain. In one example, at least two consecutive values in the pilot sequence are transmitted in different OFDM symbols of the frame. In such example, odd pilot values (e.g., $P_1, P_3, P_5 \ldots$) in the pilot sequence may be transmitted over a different OFDM symbol than even pilot values (e.g., $P_2, P_4, P_6 \ldots$) in the pilot sequence. In yet another embodiment, a leading subset of pilot values in the pilot sequence is transmitted over a different OFDM symbol than a trailing subset of pilot values in the pilot sequence. By way of example, if the pilot sequence includes 96 pilot values, then the first 48 pilot values may be transmitted over a different OFDM symbol than the last 48 pilot values. In yet another embodiment, a comb-type pilot symbol arrangement is used such that both code division multiplexing and frequency division multiplexing are used to mitigate interference from pilot sequence transmissions of different UEs. These and other aspects and other described in greater detail below.

FIG. 1 is a diagram of a wireless network 100 for communicating data. The wireless network 100 includes a base station 110 having a coverage area 101, a plurality of mobile devices 120, and a backhaul network 130. As shown, the base station no establishes uplink (dashed line) and/or downlink (dotted line) connections with the mobile devices 120, which serve to carry data from the mobile devices 120 to the base station no and vice-versa. Data carried over the uplink/downlink connections may include data transmitted between the mobile devices 120, as well as data transmitted to/from a remote-end (not shown) by way of the backhaul network 130. As used herein, the term "base station" refers to any component (or collection of components) configured to provide wireless access to a network, such as an evolved NodeB (eNB), a macro-cell, a femtocell, a Wi-Fi access point (AP), or other wirelessly enabled devices. Base stations may provide wireless access in accordance with one or more wireless communication protocols, e.g., long term evolution (LTE), LTE advanced (LTE-A), High Speed Packet Access (HSPA), Wi-Fi 802.11a/b/g/n/ac. As used herein, the term "mobile device" refers to any component (or collection of components) capable of establishing a wireless connection with a base station. The terms "mobile device," "user equipment (UE)," and "mobile station (STA)" are used interchangeably throughout this disclosure. In some embodiments, the network 100 may comprise various other wireless devices, such as relays.

Figure 2:
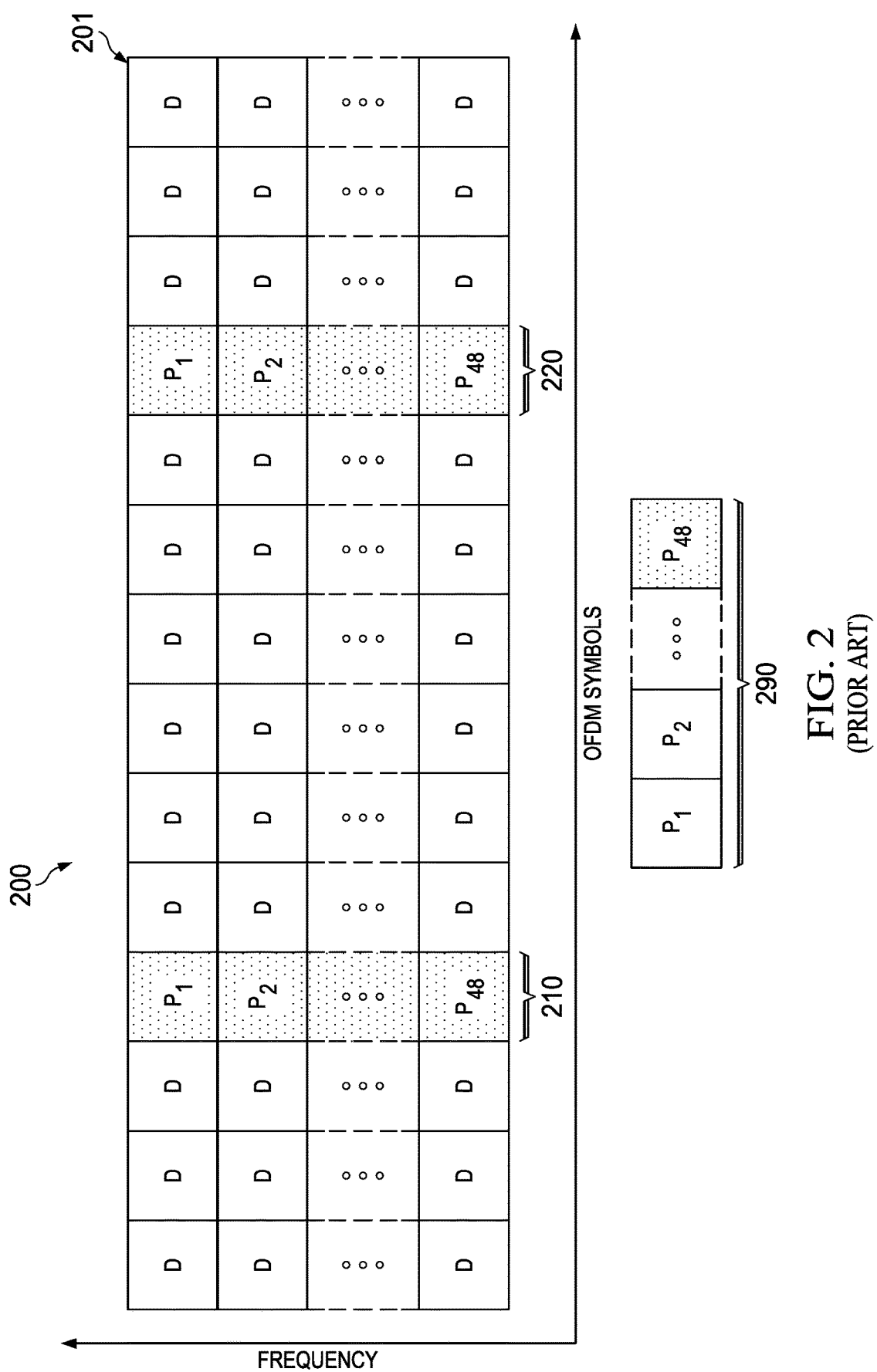
FIG. 2 is a diagram of a conventional frame structure for an uplink frame.

FIG. 2 is a diagram of a conventional frame structure 200 for an uplink frame 201 in a fourth generation (4G) long term evolution (LTE) network. As shown, a pilot sequence 290 is transmitted over a OFDM symbol 210, and then retransmitted over the OFDM symbol 220. The pilot sequence 290 includes forty eight values $P_1, P_2, \ldots P_{48}$.

Each of the symbols $P_1, P_2, \ldots P_{48}$ are transmitted in the OFDM symbol 210, and then retransmitted in the OFDM symbol 220.

Figure 3:
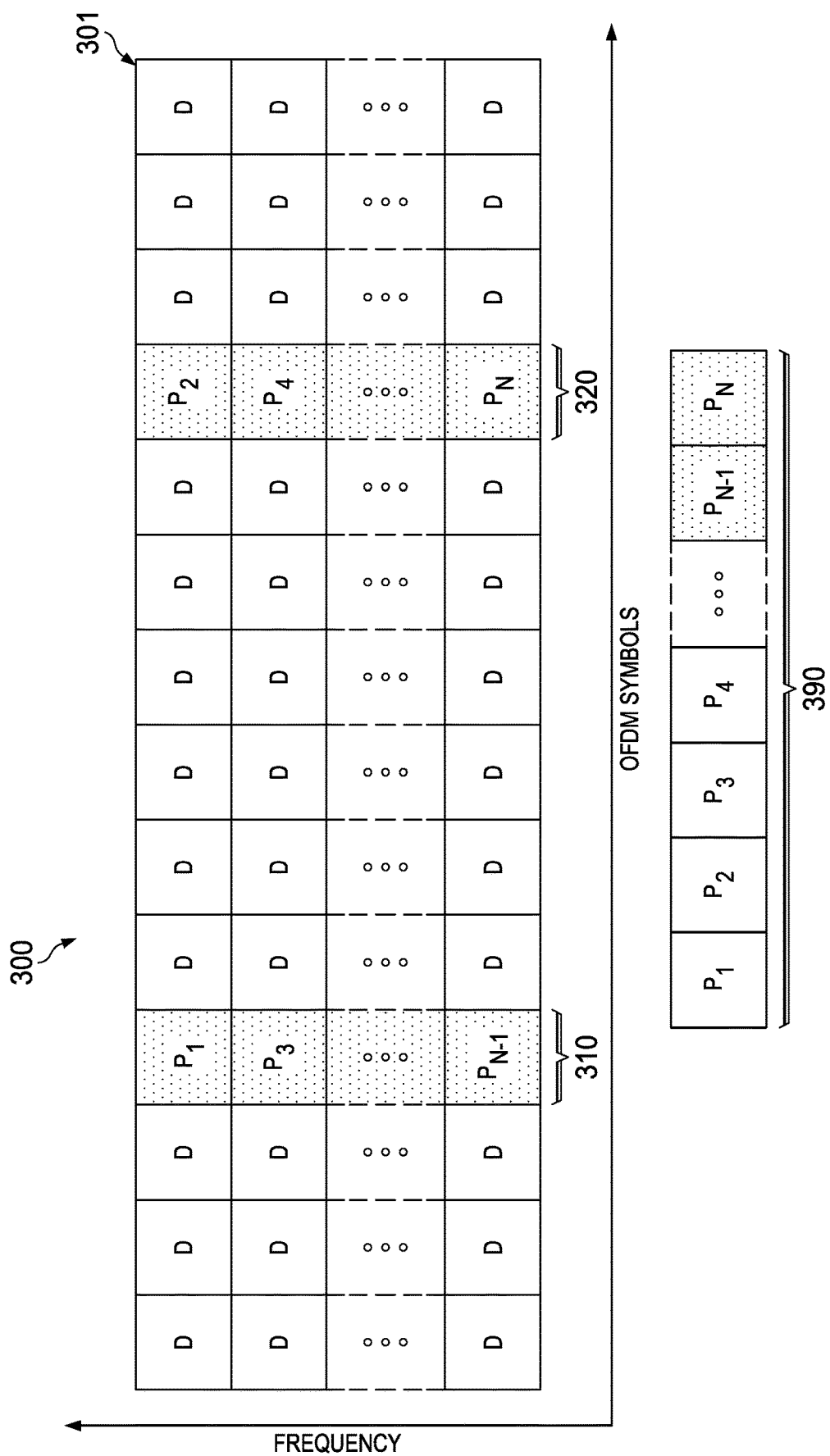
FIG. 3 is a diagram of an embodiment frame structure for an uplink frame.

Embodiments of this disclosure provide new frame formats that support longer pilot sequences. FIG. 3 is a diagram of an embodiment frame structure 300 for an uplink frame 301. As shown, a pilot sequence 390 is transmitted over OFDM symbols 310, 320 of the uplink frame 301. In this example, odd values $P_1, P_3, \ldots P_{N-1}$ of the pilot sequence 390 are transmitted over the OFDM symbol 310, and even values $P_2, P_4, \ldots P_N$ of the pilot sequence 390 are transmitted over the OFDM symbol 320. Other configurations are also possible. For example, even values $P_2, P_4, \ldots P_N$ of the pilot sequence 390 may be transmitted over the OFDM symbol 310, and odd values $P_1, P_3, \ldots P_{N-1}$ of the pilot sequence 390 may be transmitted over the OFDM symbol 320. In one embodiment, the pilot sequence 390 consists of 96 pilot values (i.e., N=96).

Figure 4:
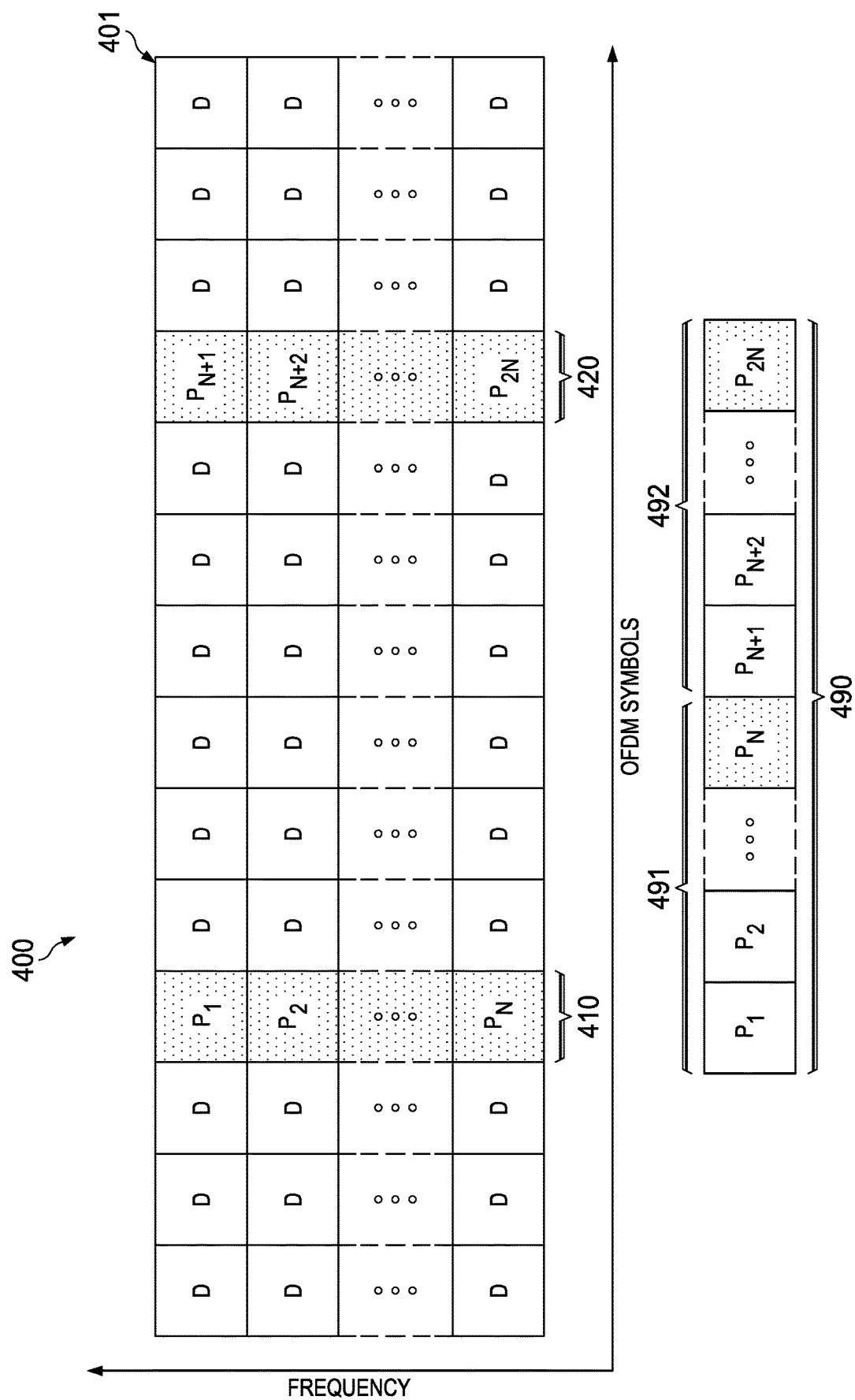
FIG. 4 is a diagram of another embodiment frame structure for an uplink frame.

FIG. 4 is a diagram of an embodiment frame structure 400 for an uplink frame 401. As shown, a pilot sequence 490 is transmitted over OFDM symbols 410, 420 of the uplink frame 401. The pilot sequence 490 includes a leading subset of pilot values 91 and a trailing subset of pilot values 492. The elements of pilot sequence $P_1, P_2, \ldots P_N$ in the leading subset of pilot values 491 are transmitted over the OFDM symbol 410, and pilot values $P_{N+1}, P_{N+2}, \ldots P_{2N}$ in the trailing subset of pilot values 492 are transmitted over the OFDM symbol 420. In this example, the first pilot value $P_1$ in the leading subset of pilot values 491 is transmitted over the same frequency sub-band as the first pilot value $P_{N+1}$ in the trailing subset of pilot values 492. Other examples are also possible. In one embodiment, the pilot sequence 490 consists of 96 pilot values (i.e., N=48).

Figure 5:
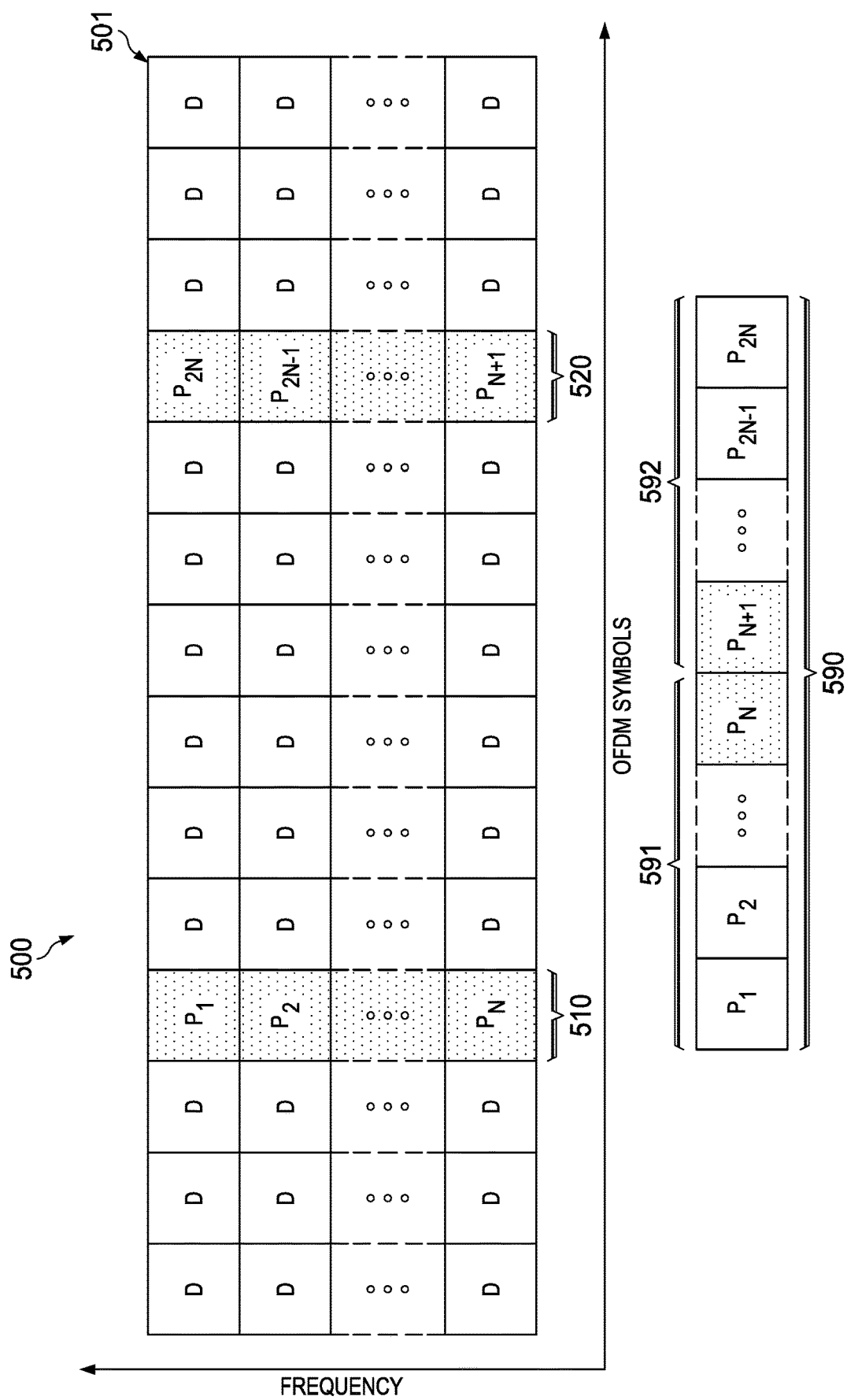
FIG. 5 is a diagram of yet another embodiment frame structure for an uplink frame.

FIG. 5 is a diagram of another embodiment frame structure 500 for an uplink frame 501. As shown, a pilot sequence 590 is transmitted over OFDM symbols 510, 520 of the uplink frame 501. The pilot sequence 590 includes a leading subset of pilot values 591 and a trailing subset of pilot values 592. Pilot values $P_1, P_2, \ldots P_N$ in the leading subset of pilot values 591 are transmitted over the OFDM symbol 510, and pilot values $P_{N+1}, P_{N+2}, P_{2N}$ in the trailing subset of pilot values 592 are transmitted over the OFDM symbol 520. In this example, the first pilot value $P_1$ in the leading subset of pilot values 591 is transmitted over the same frequency sub-band as the last pilot value $P_{N+1}$ in the trailing subset of pilot values 592. In one embodiment, the pilot sequence 590 consists of 96 pilot values (i.e., N=48).

Figure 6:
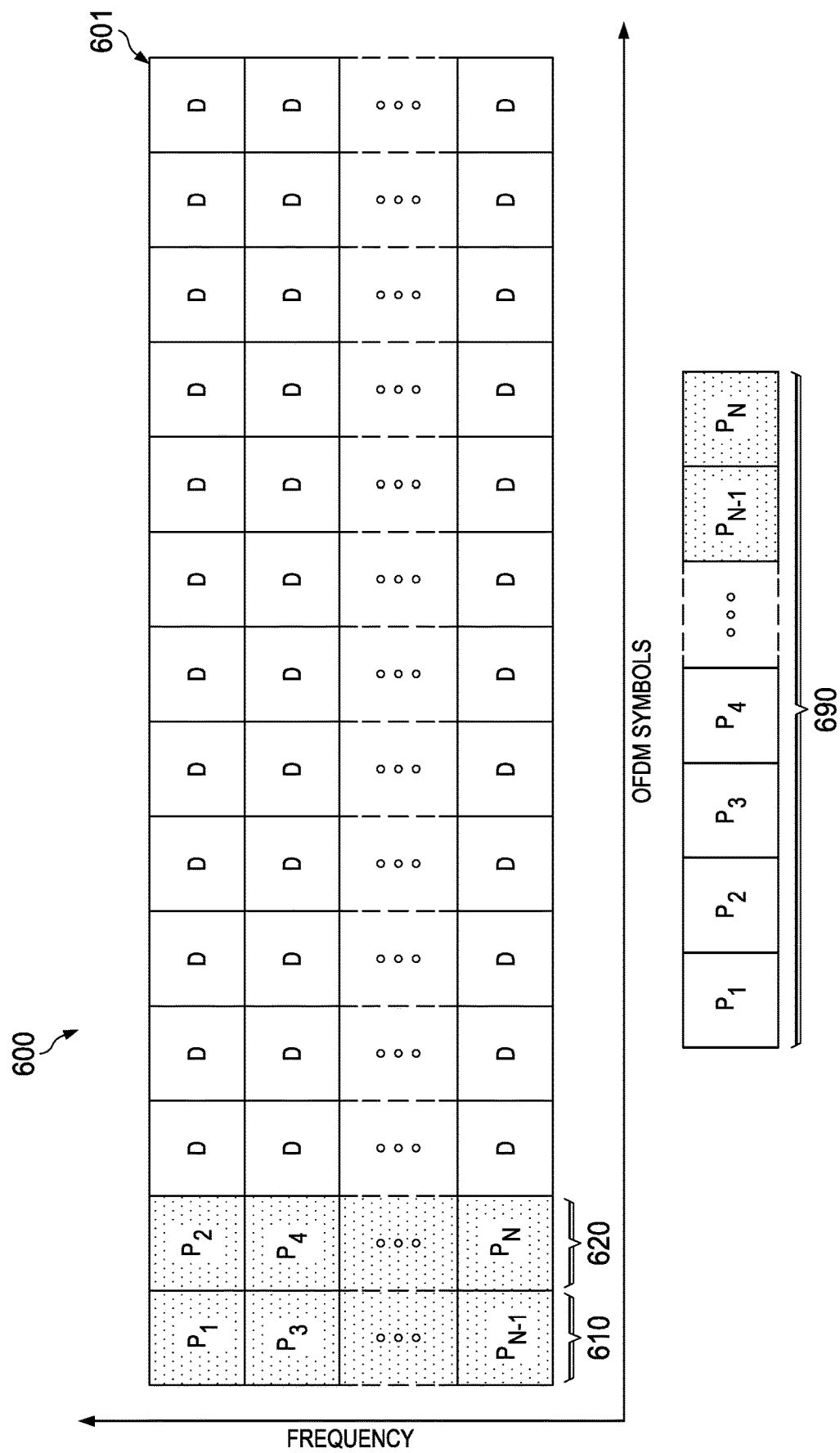
FIG. 6 is a diagram of yet another embodiment frame structure for an uplink frame.

In each of the embodiment frame configurations 300, 400, and 500, the pilot sequences 390, 490, and 590 are transmitted over non-contiguous OFDM symbols. In other embodiment frame configurations, a pilot sequence is transmitted over contiguous OFDM symbols. FIG. 6 is a diagram of another embodiment frame structure 600 for an uplink frame 601. As shown, a pilot sequence 690 is transmitted over contiguous OFDM symbols 610, 620 of the uplink frame 601. In this example, odd values $P_1, P_3, \ldots P_{N-1}$ of the pilot sequence 690 are transmitted over the OFDM symbol 610, and even values $P_2, P_4, \ldots P_N$ of the pilot sequence 690 are transmitted over the OFDM symbol 620. Other configurations are also possible. For example, even values $P_2, P_4, \ldots P_N$ of the pilot sequence 690 may be transmitted over the OFDM symbol 610, and odd values $P_1, P_3, \ldots P_{N-1}$ of the pilot sequence 690 may be transmitted over the OFDM symbol 620. In one embodiment, the pilot sequence 690 consists of 96 pilot values (i.e., N=96).

Figure 7:
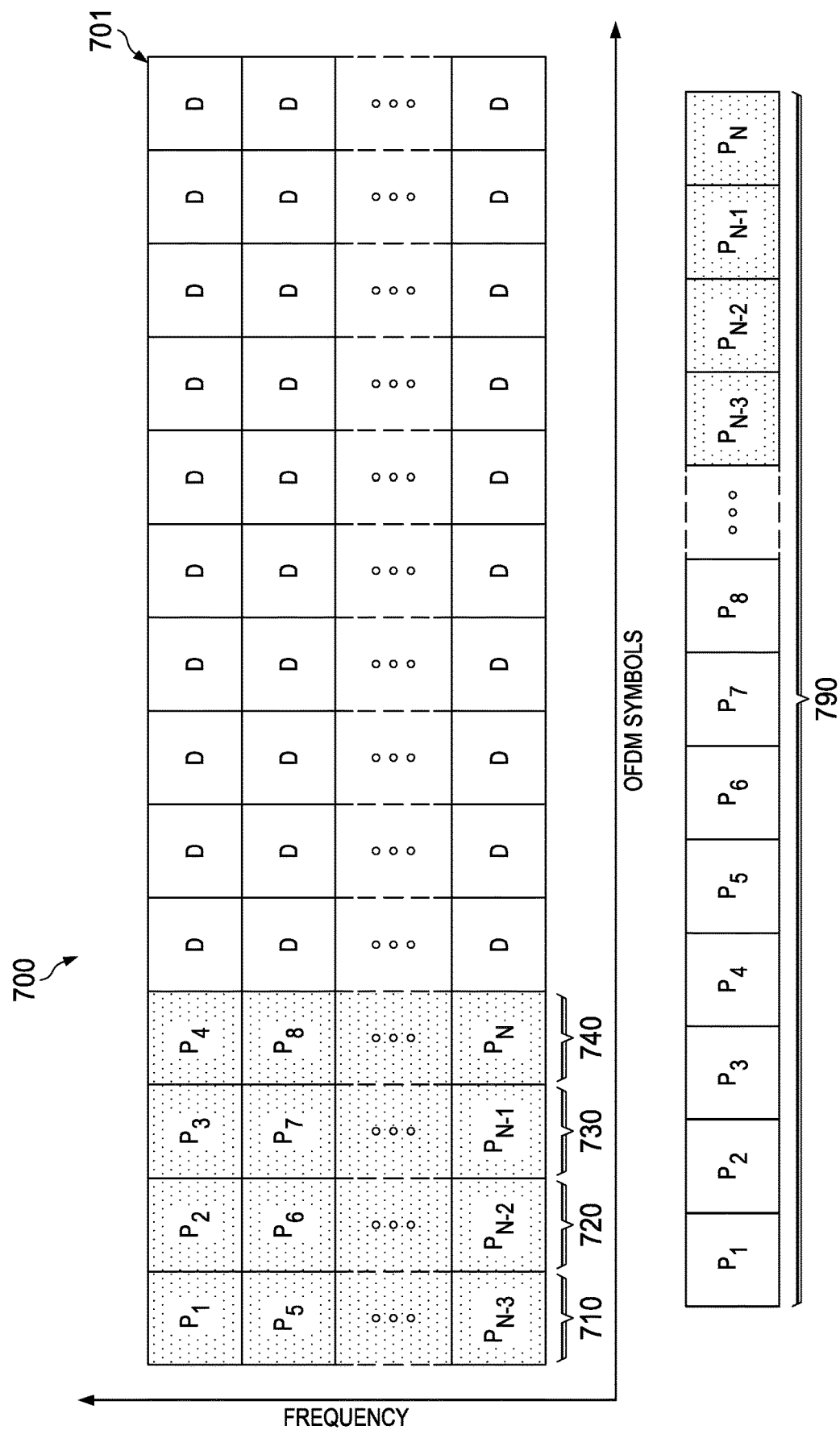
FIG. 7 is a diagram of yet another embodiment frame structure for an uplink frame.

In some embodiments, pilot values are transmitted in the beginning of a frame. For example, pilot values may be transmitted over the first few contiguous OFDM symbols of a frame. In such an example, the pilot values may be transmitted in the preamble of the frame. Transmitting pilot values in the beginning of the frame may allow the receiver to obtain a channel estimate earlier than would be the case if the pilot values were transmitted in subsequent OFDM symbols. FIG. 7 is a diagram of another embodiment frame structure 700 for an uplink frame 701. As shown, a pilot sequence 790 is transmitted over contiguous OFDM symbols 710, 720, 730, 740 of the uplink frame 701. In this example, each set of four consecutive values in the pilot sequence 790 are transmitted over sequentially over the OFDM symbols 710, 720, 730, 740. In this way, a first set of pilot values $P_1, P_5, \ldots P_{N-3}$ is transmitted over the OFDM symbol 710, a second set of pilot values $P_2, P_6, \ldots P_{N-2}$ is transmitted over the OFDM symbol 720, a third set of pilot values $P_3, P_7, \ldots P_{N-1}$ is transmitted over the OFDM symbol 730, and a fourth set of pilot values $P_4, P_8, \ldots P_N$ is transmitted over the OFDM symbol 740. Other configurations are also possible. For example, a first set of consecutive values $P_1, P_2, \ldots P_{N/4}$ may be transmitted over the OFDM symbol 710, a second set of consecutive values $P_{N/4+1}, P_{N/4+2}, \ldots P_{N/2}$ may be transmitted over the OFDM symbol 720, a third set of consecutive values $P_{N/2+1}, P_{N/2+2}, \ldots P_{3N/4}$ may be transmitted over the OFDM symbol 730, and a fourth set of consecutive values $P_{3N/4+1}, P_{3N/4+2}, \ldots P_N$ may be transmitted over the OFDM symbol 740. In one embodiment, the pilot sequence 690 consists of 96 pilot values (i.e., N=96).

Figure 8:
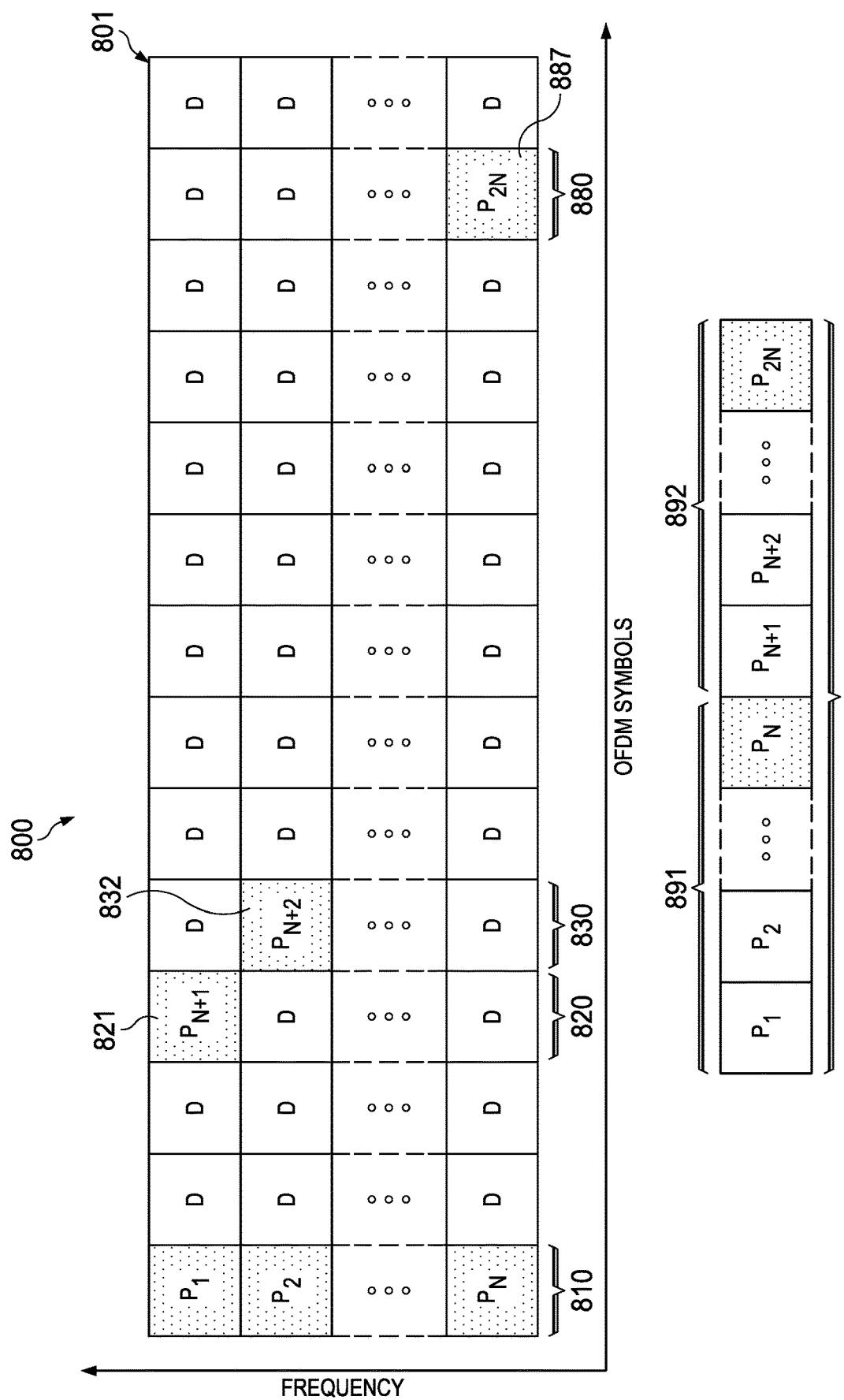
FIG. 8 is a diagram of yet another embodiment frame structure for an uplink frame.

In some embodiments, consecutive elements of pilot sequence may be staggered over different OFDM symbols. FIG. 8 is a diagram of another embodiment frame structure Boo for an uplink frame 801. As shown, a pilot sequence 890 is transmitted over contiguous OFDM symbols 810, 820, 830, 840 of the uplink frame 801. The pilot sequence 890 includes a leading subset of pilot values 891 and a trailing subset of pilot values 892. Pilot values $P_1, P_2, \ldots P_N$ in the leading subset of pilot values 891 are transmitted over the OFDM symbol 810. Pilot values $P_{N+1}, P_{N+2}, \ldots P_{2N}$ in the trailing subset of pilot values 892 are staggered over the OFDM symbols 820, 830, 880. In particular, the pilot values $P_{N+1}, P_{N+2}, \ldots P_{2N}$ are transmitted over resource units (RUs) 821, 832, . . . 887 (respectively) in the OFDM symbols 820, 830, . . . 880 (respectively). Other examples are also possible. In one embodiment, the pilot sequence 890 consists of 96 pilot values (i.e., N=48).

Figure 9:
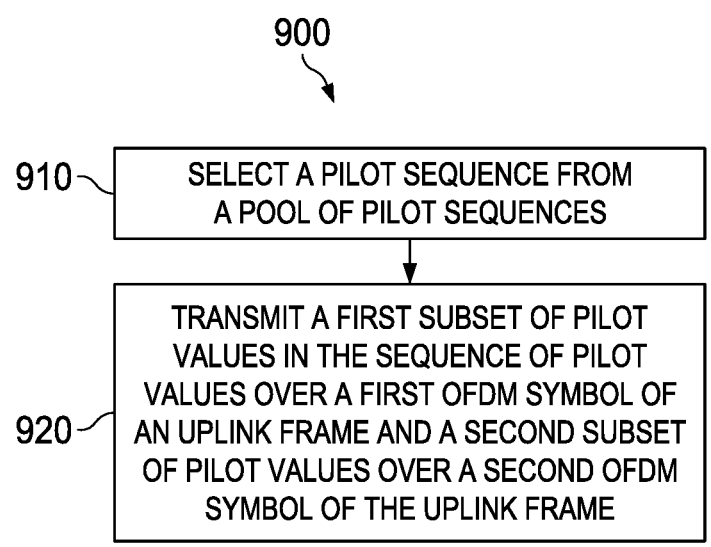
FIG. 9 is a flowchart of an embodiment method for transmitting pilot sequences when accessing an uplink grant-free channel.

FIG. 9 is a flowchart of an embodiment method 900 for transmitting pilot sequences when accessing an uplink grant-free channel, as may be performed by an UE. At step 910, the UE selects a pilot sequence from a pool of pilot sequences. The pilot sequence includes a sequence of pilot values, and may be selected randomly or based on a selection rule. At step 920, the UE transmits a first subset of pilot values in the sequence of pilot values over a first OFDM symbol, and a second subset of pilot values in the sequence of pilot values over a second OFDM symbol. The second subset of pilot values is distinct from the first subset of pilot symbols.

Figure 10:
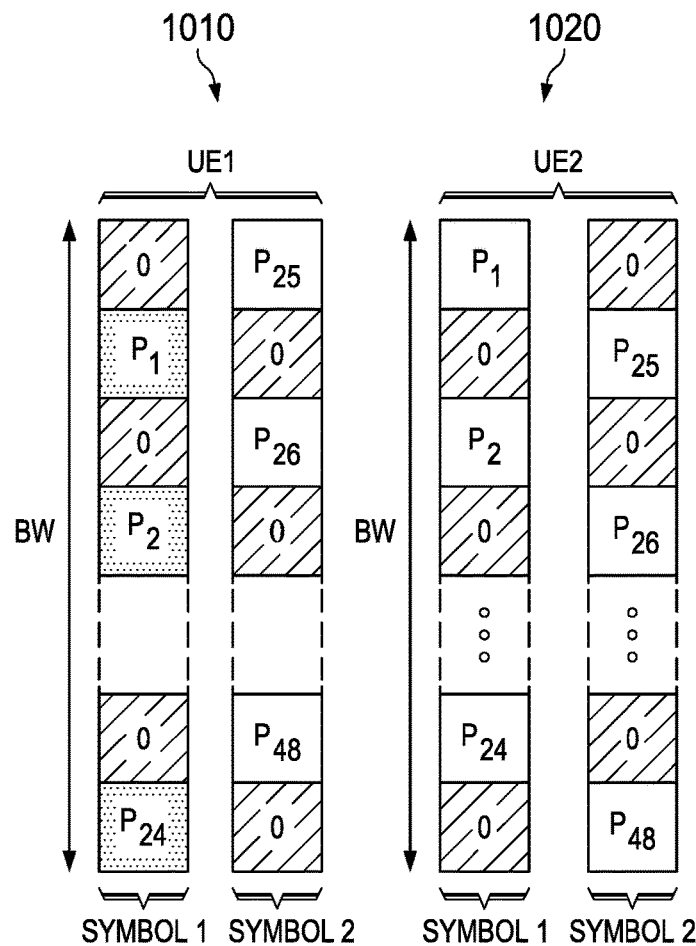
FIG. 10 is a diagram of a comb-type pilot transmission scheme for SCMA grant-free multiple access.

FIG. 10 is a diagram of a comb-type pilot sequence transmission scheme for grant-free multiple access using frequency-domain sparse spreading, for example as might be used in SCMA. In this example, a first UE (UE1) and a second UE (UE2) use the same pilot sequence ($P_1, P_2, \ldots P_{48}$) to communicate over two OFDM symbols. The pilot sequence transmissions of UE1 and UE2 are frequency division multiplexed such that UE1 and UE2 transmit pilot sequences over different frequency tones.

In this example, a base station may receive an uplink frame carrying a first pilot sequence transmission of UE1 and a second pilot sequence transmission of UE2. The pilot sequences transmitted by UE1 and UE2 may be identical to one another. Alternatively, the pilot sequences transmitted by UE1 and UE2 may be different than one another (e.g., include different pilot values). Pilot values of the pilot sequence transmission of UE1 may be received over different sub-band frequencies of a first OFDM symbol (e.g., symbol 1) in the uplink frame than pilot values of the pilot sequence transmission of UE2. In such an example, UE1 may transmit zero-power signals over sub-band frequencies in the first OFDM symbol (e.g., symbol 1) that carry pilot values transmitted by UE2, and UE2 may transmit zero-power signals over sub-band frequencies in the first OFDM symbol (e.g., symbol 1) that carry pilot values transmitted by UE1. In some embodiments, the f pilot sequence transmission of UE1 may include a first subset of pilot values (e.g., $P_1, P_2, \ldots P_{24}$) communicated over the first OFDM symbol (e.g., symbol 1), and the pilot sequence transmission of UE2 may include a second subset of pilot values (e.g., $P_{25}, P_{26}, \ldots P_{48}$) communicated over the first OFDM symbol (e.g., symbol 1). Pilot values in the first subset of pilot values (e.g., $P_1, P_2, \ldots P_{24}$) transmitted by UE1 may be received over different sub-band frequencies in the first OFDM symbol (e.g., symbol 1) than pilot values in the second subset of pilot values (e.g., $P_{25}, P_{26}, \ldots P_{48}$) transmitted by UE2. For example, pilot values in the first subset of pilot values (e.g., $P_1, P_2, \ldots P_{24}$) transmitted by UE1 may be received over even sub-band frequencies of the first OFDM symbol (e.g., symbol 1) and pilot values in the second subset of pilot values (e.g., $P_{25}, P_{26}, \ldots P_{48}$) transmitted by UE2 may be received over odd sub-band frequencies of the first OFDM symbol (e.g., symbol 1).

Additionally, the pilot sequence transmission of UE1 may include a third subset of pilot values (e.g., $P_{25}, P_{26}, \ldots P_{48}$) communicated over the second OFDM symbol (e.g., symbol 2), and the pilot sequence transmission of UE2 may include a fourth subset of pilot values (e.g., $P_1, P_2, \ldots P_{24}$) communicated over the second OFDM symbol (symbol 2). Pilot values in the third subset of pilot values (e.g., $P_{25}, P_{26}, \ldots P_{48}$) transmitted by UE1 may be communicated over different sub-band frequencies in the second OFDM symbol (e.g., symbol 2) than pilot values in the fourth subset of pilot values (e.g., $P_1, P_2, \ldots P_{24}$) transmitted by UE2. For example, pilot values in the third subset of pilot values (e.g., $P_{25}, P_{26}, \ldots P_{48}$) transmitted by UE1 may be received over odd sub-band frequencies of the second OFDM symbol (e.g., symbol 2) and pilot values in the fourth subset of pilot values (e.g., $P_1, P_2, \ldots P_{24}$) transmitted by UE2 may be received over even sub-band frequencies of the second OFDM symbol (e.g., symbol 2). Other examples are also possible.

Figure 11:
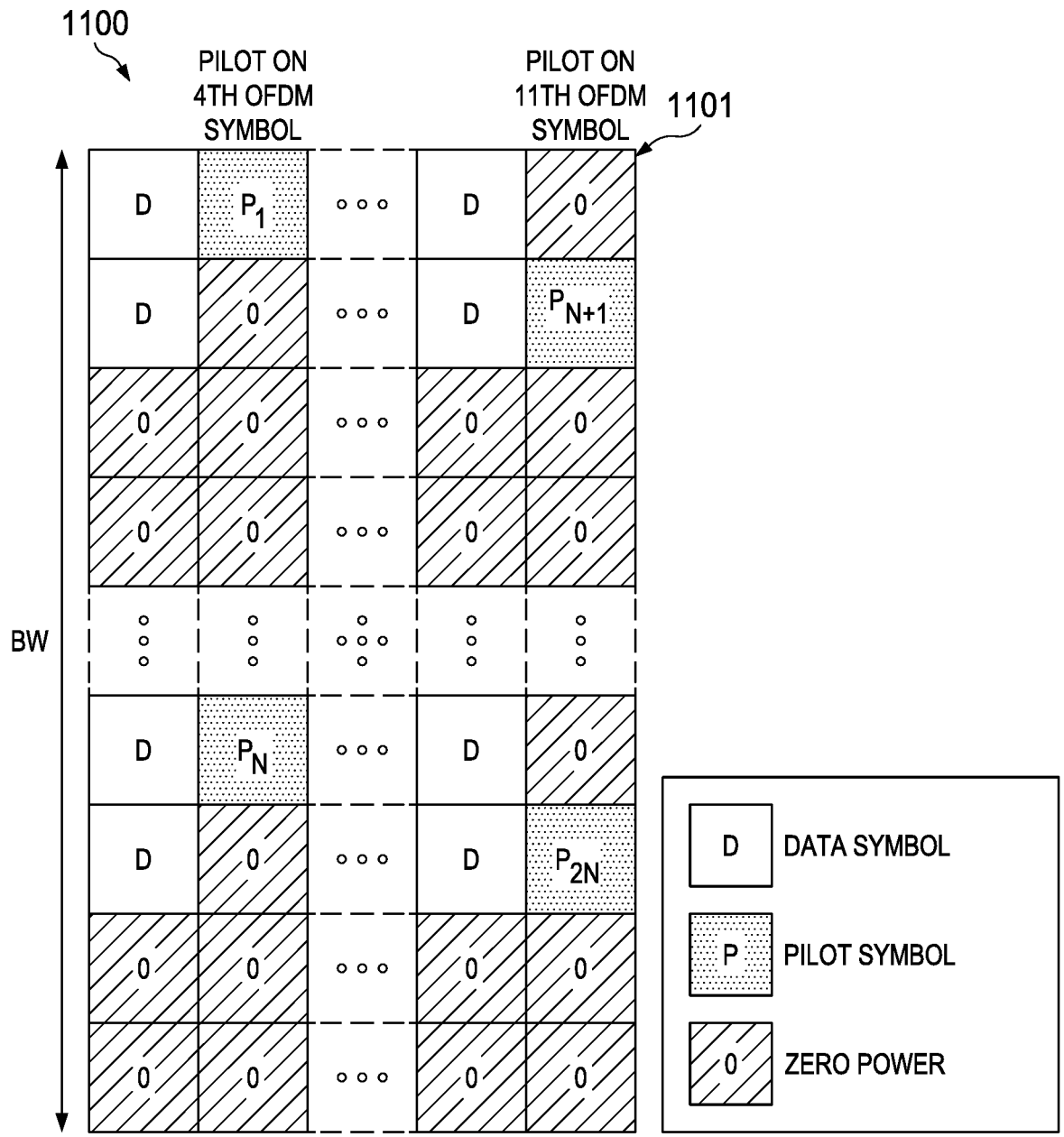
FIG. 11 is a diagram of an embodiment frame structure for aligning a comb-type pilot sequence transmission scheme with an SCMA data structure in an uplink frame.

The comb-type pilot transmission scheme can be aligned with an SCMA data structure. FIG. 11 is a diagram of an embodiment frame structure 1100 for aligning a comb-type pilot transmission scheme with an SCMA data structure in an uplink frame 1101. In this example, a UE may transmit data values and a pilot sequence in an uplink frame. The data values may be transmitted over a subset of sub-band frequencies in the uplink frame (e.g., sub-band frequencies labeled "D" in FIG. 11). The pilot sequence may include a first subset of pilot values (e.g., $P_1, P_2, \ldots P_N$) that are transmitted over a leading orthogonal frequency division multiplexed (OFDM) symbol (e.g., the $4^{th}$ OFDM symbol in FIG. 11) of the uplink frame, and a second subset of pilot values (e.g., $P_{N+1}, P_{N+2}, \ldots P_{2N}$) that are transmitted over a trailing OFDM symbol (e.g., the $11^{th}$ OFDM symbol in FIG. 11) of the uplink frame. The leading and trailing OFDM symbols may be continuous in the time-domain such that the leading symbol directly precedes the trailing symbol. Alternatively, the leading and trailing OFDM symbols may be discontinuous in the time-domain such that the leading symbol directly and the trailing symbol are separated by one or more intermediate symbols. The first subset of pilot values (e.g., $P_1, P_2, \ldots P_N$) and the second subset of pilot values (e.g., $P_{N+1}, P_{N+2}, \ldots P_{2N}$) may be transmitted over different sub-band frequencies in the subset of sub-band frequencies over which the data values are transmitted in the uplink frame. By way of example, the subset of sub-band frequencies over which the data values are transmitted may include a first group of sub-band frequencies (e.g., odd sub-band frequencies) over which the first subset of pilot values (e.g., $P_1, P_2, \ldots P_N$) are transmitted during the first OFDM symbol (e.g., the $4^{th}$ OFDM symbol in FIG. 11) and a second group of sub-band frequencies over which the second subset of pilot values (e.g., $P_{N+1}, P_{N+2}, \ldots P_{2N}$) are transmitted during the second OFDM symbol (e.g., the $11^{th}$ OFDM symbol in FIG. 11). In such an example, the UE may transmit zero-power signals over the first group of sub-band frequencies (e.g., odd sub-band frequencies) during the second OFDM symbol (e.g., the $11^{th}$ OFDM symbol in FIG. 11), as well as over the second group of sub-band frequencies (e.g., even sub-band frequencies) during the first OFDM symbol (e.g., the $4^{th}$ OFDM symbol in FIG. 11). The pilot values in the pilot sequence transmitted by the UE may be transmitted over the subset of sub-band frequencies carrying the data values transmitted by the UE without being transmitted over sub-band frequencies that are excluded from the sub-set of sub-band frequencies carrying the data values. Other examples are also possible.

Figure 12:
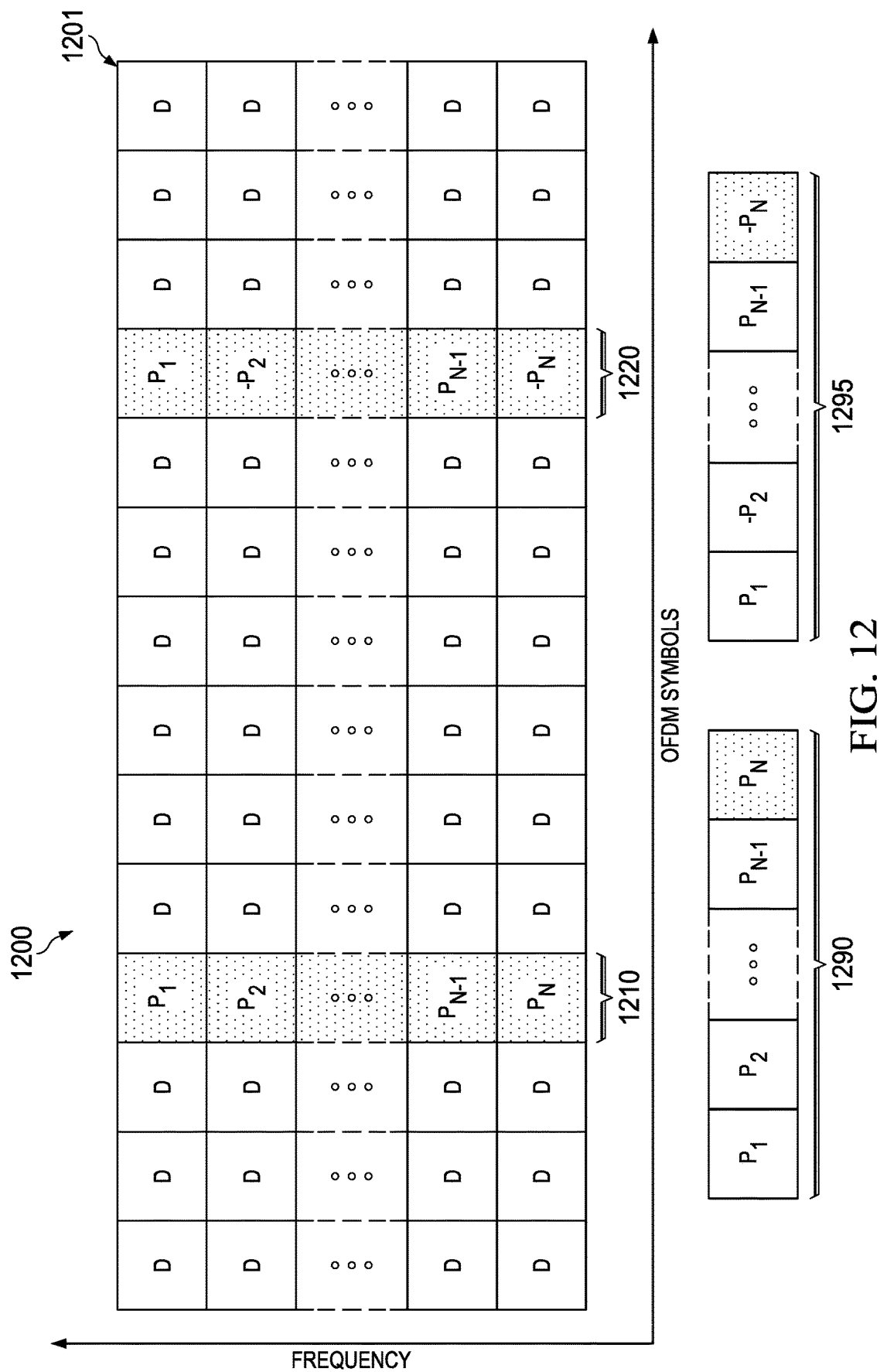
FIG. 12 is a diagram of an uplink frame.
Figure 13:
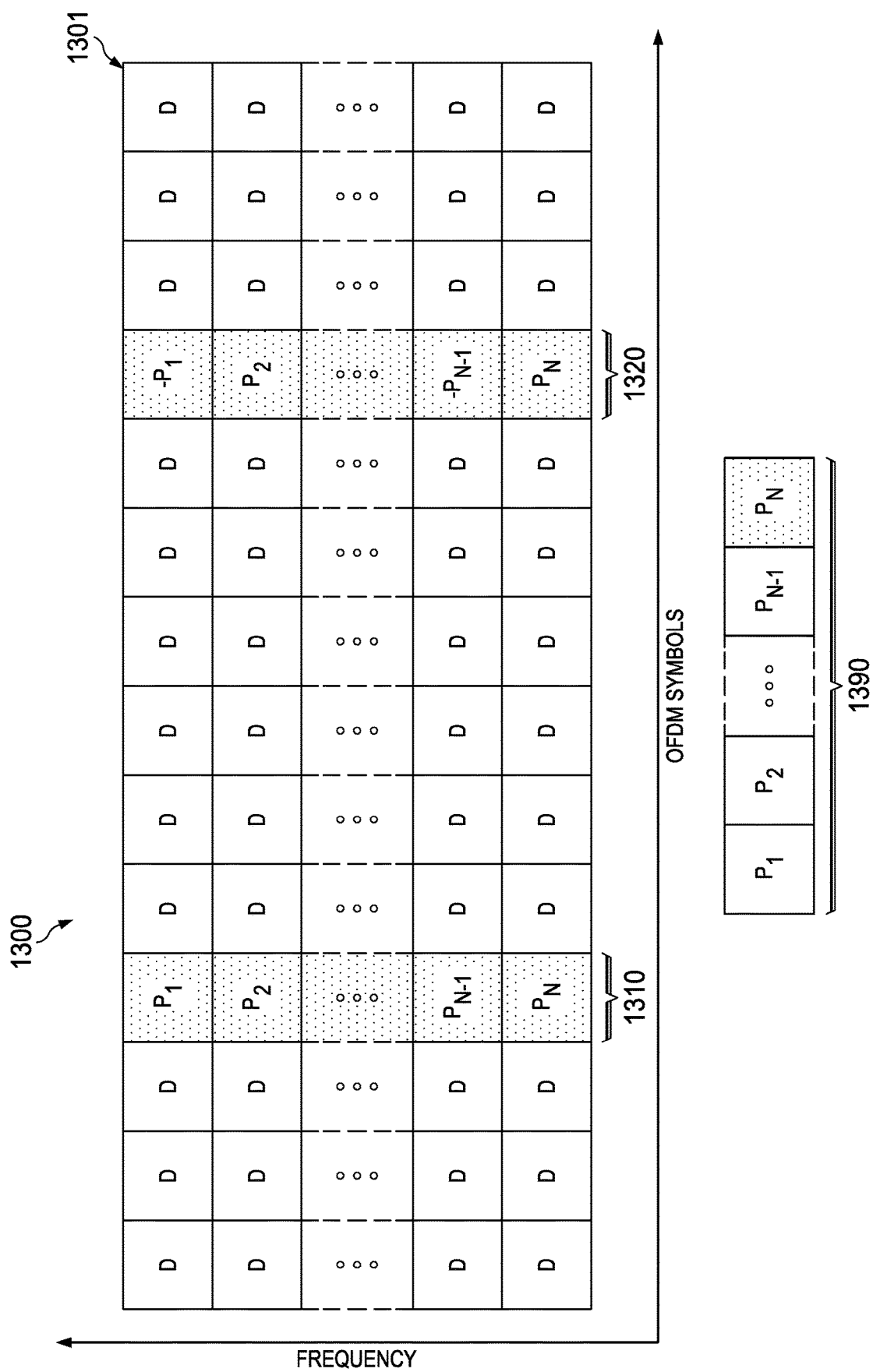
FIG. 13 is a diagram of an uplink frame.

In some embodiments, different phase shifts are used to generate pilot sequences in the same pool. The pilot sequences 1290 and 1390 in FIGS. 12 and 13 are generated by applying different phase shifts to values in a common pilot sequence. In particular, FIG. 12 is a diagram of an uplink frame 1201, and FIG. 13 is a diagram of an uplink frame 1301. As shown, the pilot sequence 1290 is transmitted over OFDM symbol 1210 of the uplink frame 1201, and then a pilot sequence 1295 is transmitted over OFDM symbol 1220 of the uplink frame. The pilot sequences 1290 and 1295 have identical pilot values, except that a phase shift is applied to even pilot values $-P_2, \ldots -P_N$ in the pilot sequence 1295. As a result, the phases of odd pilot values $P_1, \ldots P_{N-1}$ in the pilot sequences 1290, 1295 are in phase, and a phase difference exists between even pilot values $P_2, \ldots P_N$ in the pilot sequence 1290 and even pilot values $-P_2, \ldots -P_N$ in the pilot sequence 1295. In one example, the phase difference is 180 degrees. Other phase shifts are also possible. In one embodiment, the pilot sequences 1290, 1295 each consist of 48 pilot values (i.e., N=48).

As shown, a pilot sequence 1390 is transmitted over OFDM symbol 1310 of the uplink frame 1301, and then a pilot sequence 1395 is transmitted over OFDM symbol 1320 of the uplink frame. The pilot sequences 1390 and 1395 have identical pilot values, except that a phase shift is applied to odd pilot values $-P_1, \ldots -P_{N-1}$ in the pilot sequence 1395. As a result, even pilot values $P_2, \ldots P_N$ in the pilot sequences 1390, 1395 are in phase, and a phase difference exists between odd pilot values $P_1, \ldots P_{N-1}$ in the pilot sequence 1390 and odd pilot values $-P_1, \ldots -P_{N-1}$ in the pilot sequence 1395. In one example, the phase difference is approximately 90 degrees. Other phase shifts are also possible. In one embodiment, the pilot sequences 1390, 1395 each consist of 48 pilot values (i.e., N=48).

Figure 14:
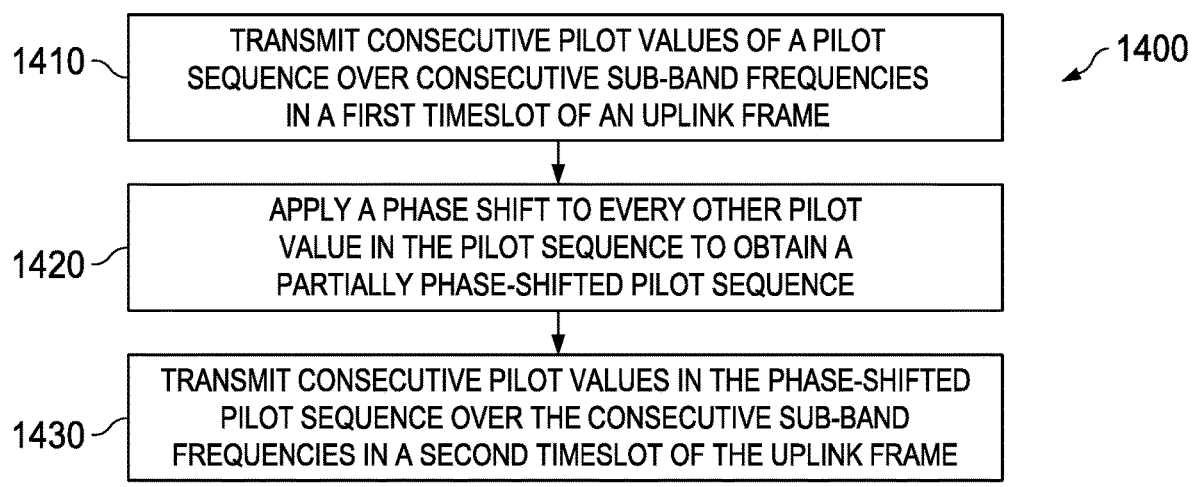
FIG. 14 is a flowchart of an embodiment method for transmitting pilot sequences when accessing an uplink grant-free channel.

FIG. 14 is a flowchart of an embodiment method 1400 for transmitting pilot sequences when accessing an uplink grant-free SCMA channel, as may be performed by a UE. At step 1410, the UE transmits consecutive pilot values of a pilot sequence over consecutive sub-band frequencies in a first OFDM symbol of an uplink frame. At step 1420, the UE applies a phase shift to every other pilot value in the pilot sequence to obtain a partially phase-shifted pilot sequence. At step 1430, the UE transmits consecutive pilot values in the phase-shifted pilot sequence over the consecutive sub-band frequencies in a second OFDM symbol of the uplink frame.

Figure 15:
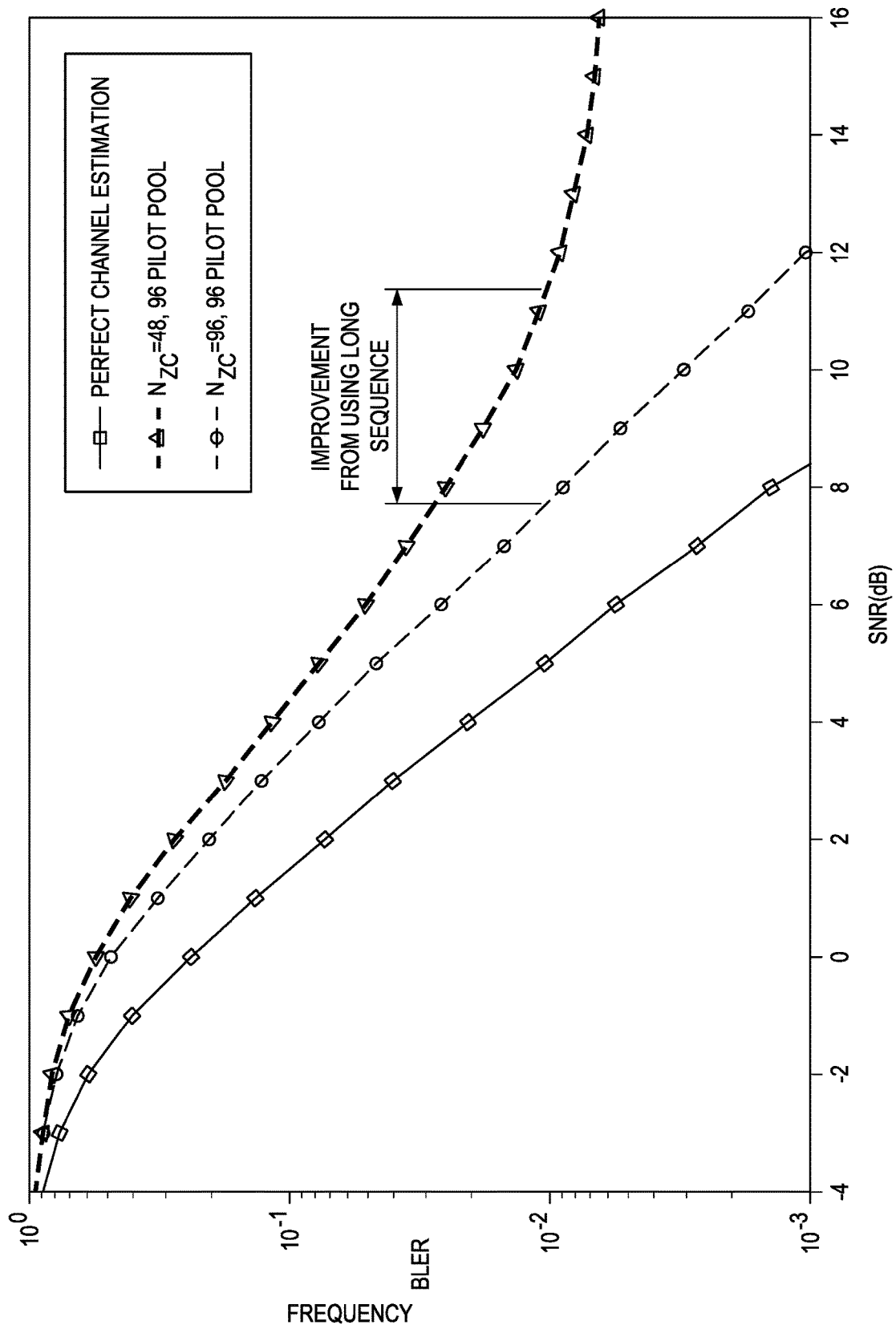
FIG. 15 is a graph comparing signal-to-noise ratio (SNR) performance for different length pilot sequences.

FIG. 15 is a graph comparing block error rate (BLER) performance for a length-96 base pilot sequence and length-48 base pilot sequence according to an urban micro (UMi) channel model with 12 UEs. The BLER performance is evaluated over a range of signal-to-noise ratios (SNRs). In this example, both the base pilot sequences were used to generate a pool of 96 pilot sequences, with the pool generated from the longer sequence having lower average levels of cross-correlation between pilot sequences. As shown, the BLER performance of the 96-value root pilot sequence is 3.5 decibels (dB) better than the 48-value sequence at a block error rate (BLER) of 0.01. The SNR performance of the 96-value root sequence is only 2 dB less than the ideal channel at a BLER of 0.1.

Figure 16:
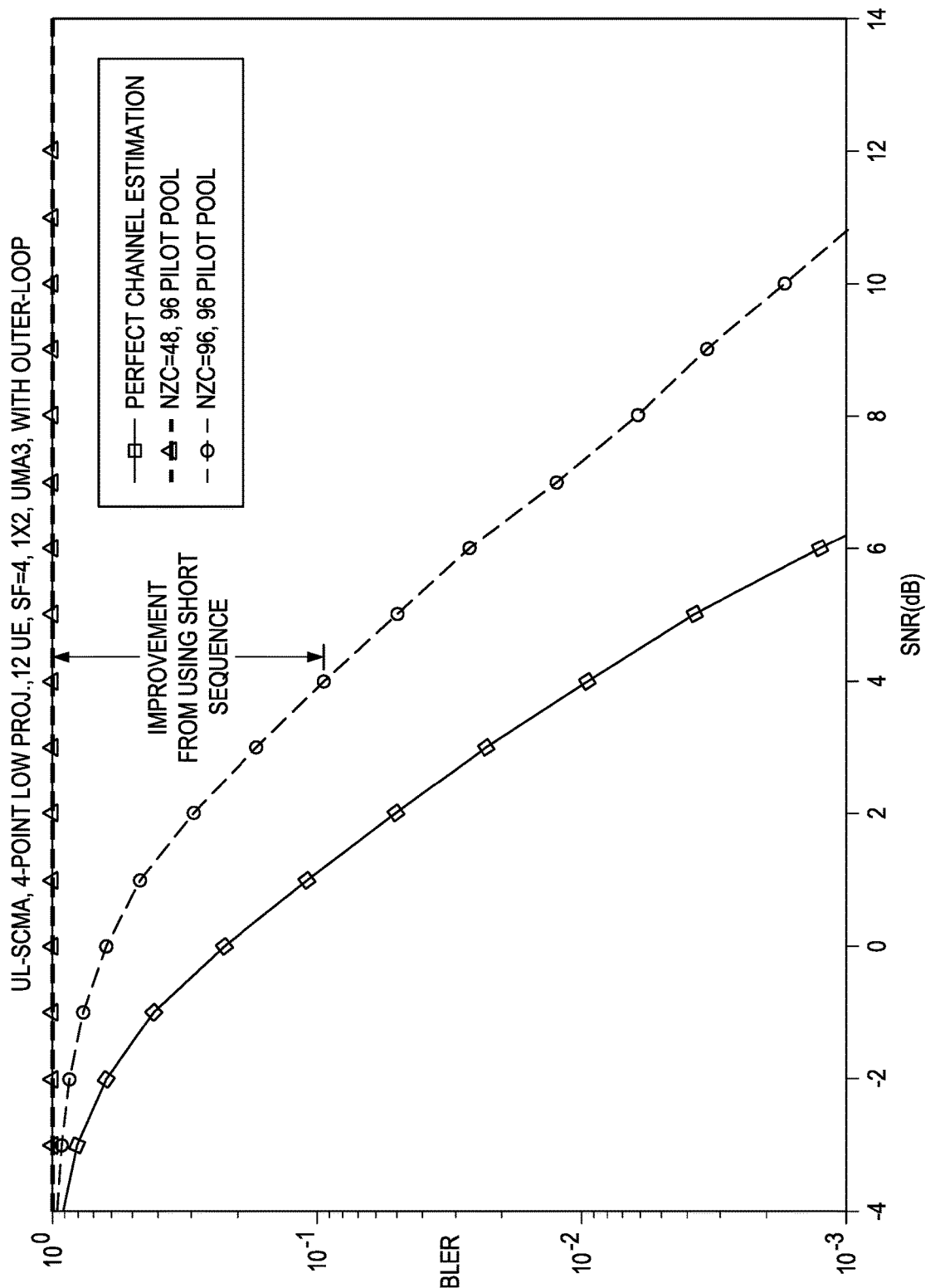
FIG. 16 is another graph comparing SNR performance for different length pilot sequences.

FIG. 16 is a graph comparing BLER performance for a 96-value root pilot sequence and 48-value root pilot sequence according to an urban macro (UMa) channel model with 12 UEs. The BLER performance is evaluated over a range of SNRs. As shown, the 48-value sequence is inoperable in this simulation, and 96-value root sequence offer reasonable performance in this simulation.

Figure 17:
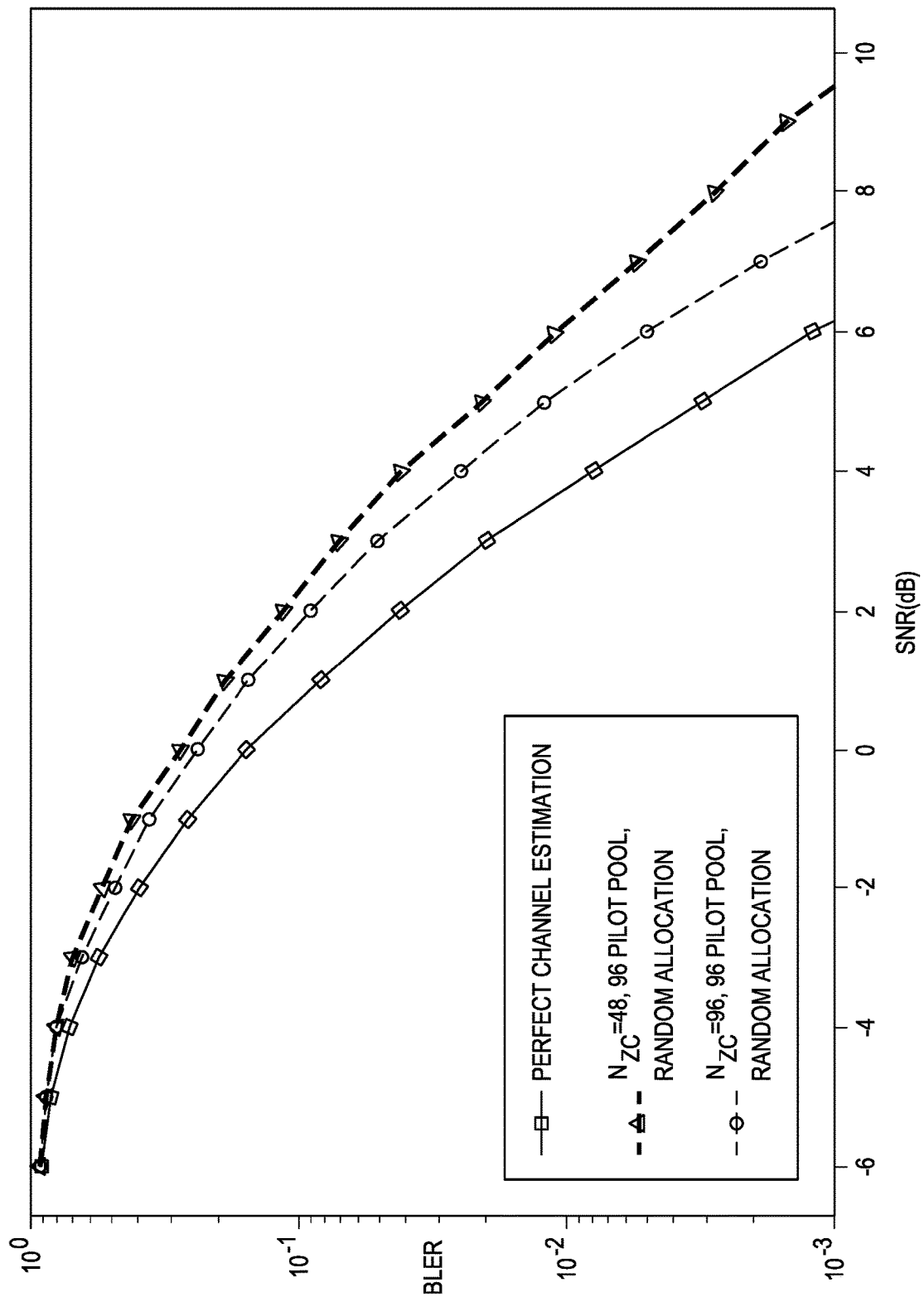
FIG. 17 is yet another graph comparing SNR performance for different length pilot sequences.

FIG. 17 is a graph comparing BLER performance for a 96-value root pilot sequence and 48-value root pilot sequence according to an urban macro (UMa) channel model with 6 UEs. Both root sequences offer reasonable performance in this simulation.

Figure 18:
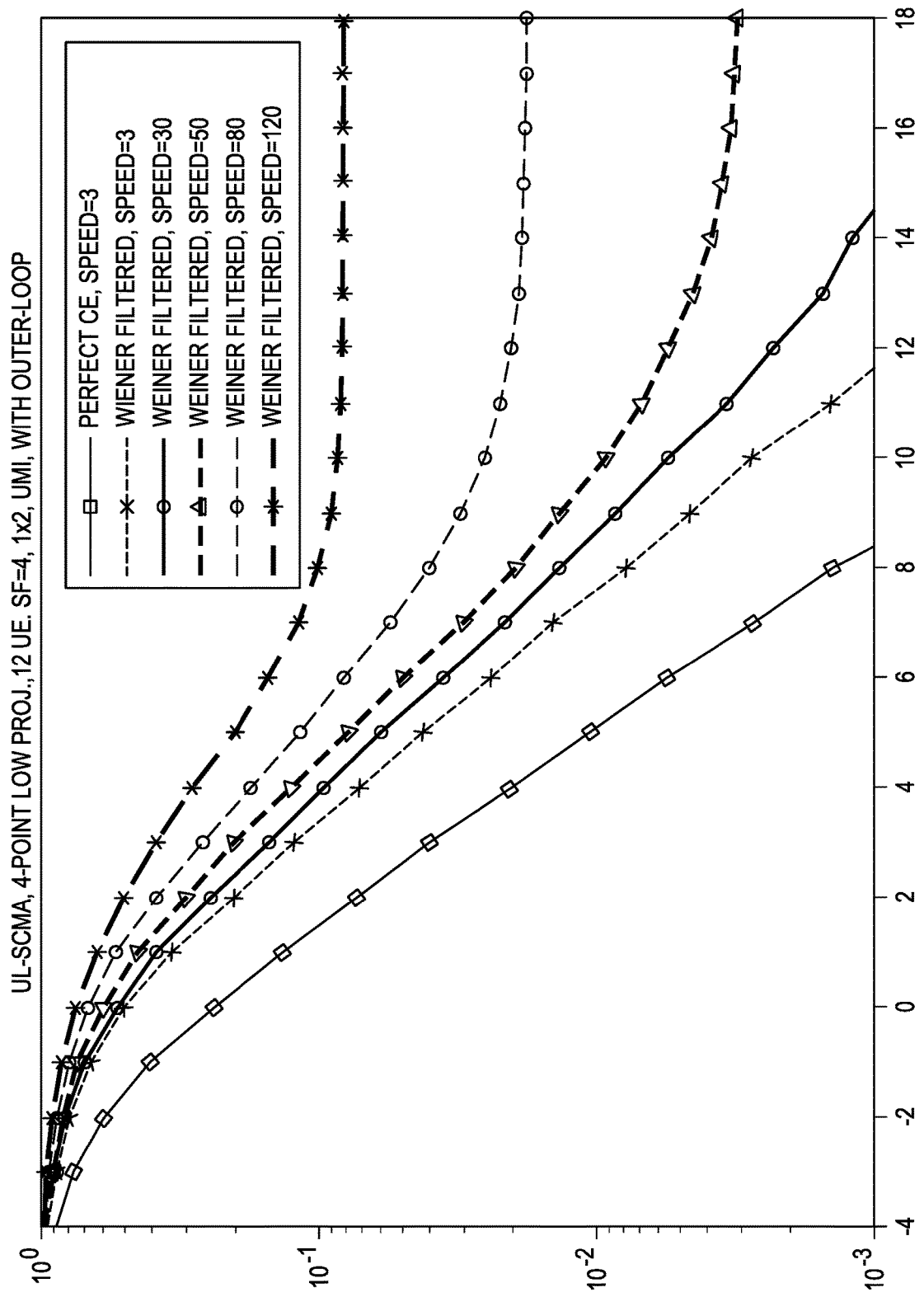
FIG. 18 is a graph comparing SNR performance for a 96-value pilot sequence when used by UEs exhibiting different levels of mobility.

FIG. 18 is a graph comparing BLER performance of a 96-value base pilot sequence for UEs exhibiting different speeds according to an urban micro (UMi) channel model with 12 UEs. Table 1 provides configuration parameters for the simulations used to generate the graphs depicted in FIGS. 15-18.

TABLE 1

| | |
|---|---|
| Number of UEs | 6 or 12 |
| Pilot sequence generation for orthogonal pilot sequences | Best L = 6/12 orthogonal pilot sequences using CS of 1 reference Zadoff-Chu sequence, each UE allocated one fixed pilot sequence among the 6/12 orthogonal pilot sequences |
| Pilot sequence generation and allocation based on large pilot pool | 96 pilot sequences are created based on N = 8 different Zadoff-Chu sequences, for each root sequence, L = 12 best orthogonal pilot sequences are created using different CS value. For each simulation iteration, each UE randomly selects one pilot sequence among the 96 pilot pool (exclude pilot sequence collision) |
| Pilot sequence length | $N_{ZC}$ = 48 for independent pilot sequence in two slots, $N_{ZC}$ = 96 for long sequence across two slots (horizontal placement) |
| Pilot sequence power scaling assumption | Same PSD for pilot and active data tones, BLER figure is based on SNR per UE per active tone. |
| Resource allocation | 4 localized RBs | Spreading factor | 4 |
| SCMA Modulation | 4-point with low projection | Outer-loop iterations | 7 |
| Code Rate | 1/2 | UE speed | 3 km/h |
| Channel model | PB, UMI, or UMA | MIMO mode | 1x2 |

Pilot sequence transmissions from different user equipments (UEs) over the same time-frequency resources may interfere with one another. Accordingly, SCMA frames may need to include a relatively large number of pilot sequence resources to achieve the low cross-correlation between pilot sequences needed to manage mutual interference and have better quality channel estimation.

In fourth generation (4G) LTE, demodulation reference signal (DM-RS) pilot sequences are transmitted in uplink frames to support scheduled access. The DM-RS pilot sequences are transmitted on two symbols for each resource block (RB), and on every tone of assigned bandwidth (BW). DM-RS is a frequency-domain reference-signal sequence generated by cyclic-shift (CS) of extended Zadoff-Chu sequences.

With respect to pilot sequence design requirements for uplink grant-free transmission, a large pilot pool reduces the probability of collision. By way of example, a root pilot sequence that includes at least 96 pilot values may provide a large enough pool to achieve less than a one percent pilot sequence collision probability. There may be low cross-correlation between pilot sequences in the pool to provide acceptable channel estimation in dispersive channels and/or channels carrying pilot sequence transmissions from a large number of UEs. Low pilot symbol overhead may also be desired.

Current LTE design supports a small pilot pool size especially for small bandwidth, such as 4 RBs. To extend the pilot pool size, the correlation properties of pilot sequences are sacrificed. LTE pilot sequence design has poor performance for dispersive channels or large numbers of active UEs due to non-orthogonality of pilot sequences with a large (required) pool size. Comb-type pilot and data symbol arrangement uses a combination of CDM and FDM to improve performance of orthogonal pilot sequences, but does not provide a solution to increase the pilot pool for grant-free transmission.

An embodiment provides a pilot sequence design for uplink SCMA grant-free transmission. An embodiment generates a long sequence and places the long sequence over multiple orthogonal frequency division multiplexing (OFDM) slots for uplink grant-free access. In an embodiment, a long sequence is spanned across multiple OFDM symbols. Different placement methods are described below. A large pilot pool is generated from a combination of orthogonal and non-orthogonal pilot sequences. Pilot sequences are assigned based on a pre-defined rule or by the network, as defined by the protocols of grant-free transmission mode.

An embodiment channel estimation method takes advantage of the pilot sequence design. An embodiment channel estimation method for uplink SCMA transmission uses non-orthogonal pilot sequences, taking advantage of the time-correlation of the channel.

An embodiment provides a larger pilot pool for a low probability of collision. The longer sequence increases the number of pilot sequences that can be generated with lower cross-correlation. For example, using Zadoff-Chu sequences of length p, with p a prime number, there are $(p-1)^2$ number of pilot sequences with cross-correlation less than $1/\sqrt{p}$.

An embodiment provides better quality of channel estimation even for a large number of active UEs in dispersive fading channels. The longer sequence with lower cross-correlations provides better capability to suppress pilot signal interference from other UEs, thus improving channel estimation performance. An embodiment maintains the same overhead as LTE design.

An embodiment enables grant-free uplink transmission by supporting more UEs on the same time-frequency resources. An embodiment enables massive machine-type communication. An embodiment improves the channel estimation performance of uplink SCMA. An embodiment removes the bottle-neck and shows the full potential and overloading advantage of SCMA transmission over OFDMA in uplink grant-free transmission. Embodiments may be implemented in wireless communications networks and devices, such as mobile terminals, infrastructure equipment, etc.

In 4G LTE, a Zadoff-Chu root sequence may be used to generate a pool of pilot sequences generated according to the following formula $$X_{m,k}^{ZC} = e^{-j\pi q \frac{k(k+1)}{M_{ZC}}},$$

$0 \leq k < M_{ZC}$. There may be thirty sequence groups corresponding to different roots of extended Zadoff-Chu sequence. Each sequence group is mapped to different cells in a specific way. Each cell uses either 1 (5 RBs or less) or 2 root sequences (>5 RBs). Different cyclic shift (CS) values are used to create orthogonal pilot sequences generated from the same root. To maintain orthogonality at the receiver, the difference in CS values among different UEs needs to be larger than the maximum channel delay spread, which is sensitive to channel dispersion. A maximum of 12 orthogonal pilot sequences can be defined for LTE uplink (the channel needs to be close to constant over 12 subcarriers).

Embodiment pilot pool generation uses a long extended Zadoff-Chu sequence across multiple OFDM symbols (e.g., 96 instead of 48 for 4 RBs across 2 OFDM symbols). L=number of CS values (orthogonal pilot sequences) from the same root, and N=number of root Zadoff-Chu sequences used. Therefore, total of L×N pilot sequences can be created (e.g. L=12, N=8 for 96 pilot sequences). L CS values are chosen with maximum separation. The N root sequence generally is chosen with lowest cross-correlation. In practice, sequence groups used in LTE can be chosen that correspond to the same and neighboring cells (e.g., for N=8, pick sequence group 1, 2, 3, 4). Different combinations of L and N can be used to create the number of pilot sequences. The value of L may be chosen according to the channel delay spread. The larger the channel delay spread, the smaller the L should be chosen.

Two methods of placing a long pilot sequence across different OFDM symbols can be used: vertical placement of the long pilot sequence, and horizontal placement of long pilot sequence. Horizontal placement provides very slightly better performance in simulations for low speed large delay spread as the channel changes slower for the same amount of CS.

For the prior design using a short sequence, the channels over different OFDM slots are estimated separately and then averaged. An embodiment channel estimation for the long sequence design jointly estimates channels from different OFDM symbols by using the time correlation of the channels. A simplification for low speed UEs jointly estimates the channels from different OFDM symbols by assuming channels do not change over time.

An alternative embodiment for pilot sequence design rearranges comb-type pilot symbols and pilot-data symbols over multiple OFDM symbols. The comb-type pilot symbols and pilot-data symbol re-arrangements are applied over multiple OFDM symbols with a longer sequence.

Another alternative embodiment for pilot sequence design utilizes FDM over multiple OFDM symbols (with one symbol transmitting zero). This supports pilot sequences that are twice as long and reduces the number of interfering UEs for each slot.

Longer root pilot sequences may offer more robust performance in UMA channels. In a UMI channel, the performance of an OCC solution may be close to that of a 96-value pilot sequence. A 96-value pilot sequence may have a peak-to-power ratio (PAPR) that is about 0.7 dB worse than a 48-value pilot sequence. However, the PAPR performance of both sequences may be typical of SCMA data transmissions.

Using a longer sequence across two slots may provide significantly better performance than using a separate sequence per time slot, especially for a channel with large delay spread. Performance degradation due to channel estimation ranges from around 1 dB (6 UE, PB) to around 3 dB (12 UE, UMA) at BLER=0.1 when a long sequence is used (same PSD for pilot and data symbols, UE speed 3 km/h). For 6 UEs in PB channel, both short and long Zadoff-Chu sequences work reasonably well even with 96 pilot sequences, and the performance degradation due to the use of non-orthogonal pilot sequences is very small. For 6 UEs in UMA channel with large delay spread, a significant improvement can be observed by using a long sequence across multiple OFDM symbols. For 12 UEs, a long sequence across multiple OFDM symbols provides significantly better channel estimation performance. In the most challenging case (12 UE, UMA channel), the short sequence does not work at all, but the long sequence works reasonably well.

For 6 UEs, using horizontal placement of the long sequence over two slots performs reasonably well even at vehicle speed at 120 km/h. There is little to no performance degradation up to 50 km/h. For 12 UEs, the long sequence design performs very well in low to medium speed.

Pilot sequence generation for 4 RB utilizes Zadoff-Chu sequences:

$$X_{m,k}^{ZC} = e^{-j\pi q \frac{k(k+1)}{M_{ZC}}},$$

$0 \leq k < M_{ZC}$, $q=1, 2, \ldots, 46$ (index of the reference Zadoff-Chu sequence) $M_{ZC}=47$ (largest prime number<48).

The reference pilot sequence of length 48 (for 4 RB) is the cyclic extension of the original Zadoff-Chu sequence:

$$X_{u,47}^{ZC} = X_{u,0}^{ZC}.$$

The cyclic shift (phase rotation in frequency domain) of the reference sequence creates multiple orthogonal pilot sequences: $X_k = X_k^{ZC} e^{-j\alpha k}$, $0 \leq k < 96$. In LTE $\alpha = 2m\pi/12$, $m \in \{0, 1, \ldots, 11\}$.

To create 96 or more pilot sequences, an embodiment uses a combination of orthogonal and non-orthogonal pilot sequences. The total number of pilot sequences=$L \times N$, where L=number of orthogonal pilot sequences from the same reference sequence, N=number of reference Zadoff-Chu sequences used.

L orthogonal pilot sequences should be selected with the maximum separation:

$$X_k = X_k^{ZC} e^{-j\alpha k}, \alpha = 2m\pi/12.$$

For example, L=2, m=0, 6 (orthogonal over every two subcarriers). L=6, m=0, 2, 4, 6, 8, 10 (orthogonal over every 6 subcarriers). L=12, m=0, 1, 2, . . . , 11 (orthogonal over every 12 subcarriers or 1 RB).

A higher L is more sensitive to frequency selectivity of the channel, therefore the larger the channel delay spread is, the smaller L should be chosen.

For pilot sequence generation using a long sequence across two slots, Zadoff-Chu sequence is:

$$X_{m,k}^{ZC} = e^{-j\pi q \frac{k(k+1)}{M_{ZC}}},$$

$0 \leq k < M_{ZC}$, $q=1, 2, \ldots, 88$ (index of the reference Zadoff-Chu sequences). $M_{ZC}=89$ (largest prime number<96).

A reference pilot sequence of length 96 (for 4 RB, two slots) is the cyclic extension of the original Zadoff-Chu sequence. The cyclic shift (phase rotation in frequency domain) of the reference sequence creates multiple orthogonal pilot sequences: $X_k = X_k^{ZC} e^{-j\alpha k}$, $0 \leq k < 96$. In LTE, $\alpha = 2m\pi/12$, $m \in \{0, 1, \ldots, 11\}$.

For reference (root) sequence selection:

$$q = \lfloor \bar{q} + 1/2 \rfloor + v \cdot (-1)^{\lfloor 2\bar{q} \rfloor}$$

$$\bar{q} = M_{ZC}(u+1)/31$$

u: Sequence group number, v $\in \{0,1\}$: Sequence number within a group,

<6 RB: set v=0, pick different root q by setting u=0, 1, 2, 3, . . .

>=6 RB: pick different root q by setting (u,v)=(0,0), (0,1), (1,0), (1,1), (2,0), (2, 1), (3, 0), . . . .

With respect to the received signal model for a channel estimation algorithm, the received signal of pilot tones at each time slot after OFDM demodulation (x is the pilot sequence, i is the UE index) is:

$$y_k = \sum_{i=1}^{M} H_{i,k} x_{i,k} + n_k \ (k = 1, 2, \ldots, 12 N_{RB})$$

$$H_k = DFT(h_n)_{N_{CE}} \ (N_{CE} \text{ is the number of } DFT \text{ points})$$

The received signal can be rewritten as:

$$y = \sum_{i=1}^{M} \text{diag}(x_i) F h_i + n$$

where $h = (h_1, h_2, \ldots, h_{L_h})$ is the time domain channel sample, $L_h$ is the number of time samples, $y = (y_1, \ldots, y_{12 N_{RB}})$ $F = (F_{k,n})_{12 N_{RB} * L_h}$, $F_{k,n} = \exp(-j 2\pi k n / N_{CE})$, k=1, 2, . . . , 12N and n=1, 2, . . . , $L_h$.

For minimum mean square error (MMSE) channel estimation, assume the channel has a power delay profile:

$$P = (P_{h_1}, P_{h_2}, \ldots, P_{h_{L_h}})$$

such that $$\sum_{l=1}^{L_h} P_{h_l} = 1.$$

Then the MMSE channel estimator is expressed as:

$$\bar{h}_i = D_P (D x_i F)^H \left( \sum_{j=1}^{M} D x_j F D_P (D x_j F)^H + N_0 I \right)^{-1} y$$

where $D_P = \text{diag}(P)_{L_h * L_h}$, $Dx = \text{diag}(x)_{12 N_{RB} * 12 N_{RB}}$.

Then $\bar{H}_k = DFT(\bar{h}_n)_{N_{CE}}$.

The final channel is obtained by averaging $\bar{H}_k$ over two slots.

For MMSE channel estimation for using a long sequence over two slots, assume the channel does not change over two slots:

$$y^1 = \sum_{i=1}^{M} \text{diag}(x_i^1) F h_i + n$$

$$y^2 = \sum_{i=1}^{M} \text{diag}(x_i^2) F h_i + n$$

Define $$y' = \begin{pmatrix} y^1 \\ y^2 \end{pmatrix}_{24N_{RB}*1}, \quad F' = \begin{pmatrix} F \\ F \end{pmatrix}_{24N_{RB}*L_h},$$

$$D'x = \begin{pmatrix} \text{diag}(x^1) & 0 \\ 0 & \text{diag}(x^2) \end{pmatrix}_{24N_{RB}*24N_{RB}}$$

Then $$\overline{h}_i = D_P (D' x_i F')^H \left( \sum_{j=1}^{M} D' x_j F' D_P (D' x_j F')^H + N_0 I \right)^{-1} y'.$$

For MMSE channel estimation considering the time-correlation of the channel, assume channels from two slots are different but correlated:

$$y^1 = \sum_{i=1}^{M} \text{diag}(x_i^1) F h_i^1 + n$$

$$y^2 = \sum_{i=1}^{M} \text{diag}(x_i^2) F h_i^2 + n$$

Define:

$$y' = \begin{pmatrix} y^1 \\ y^2 \end{pmatrix}_{24N_{RB}*1}, \quad F'' = \begin{pmatrix} F & 0 \\ 0 & F \end{pmatrix}_{24N_{RB}*2L_h},$$

$$D'x = \begin{pmatrix} \text{diag}(x^1) & 0 \\ 0 & \text{diag}(x^2) \end{pmatrix}_{24N_{RB}*24N_{RB}},$$

$$D'_P = \begin{pmatrix} \text{diag}(P)_{L_h*L_h} & 0 \\ 0 & \text{diag}(P)_{L_h*L_h} \end{pmatrix}_{2L_h*2L_h},$$

$$\sqrt{D'_P}\, h'_i = \begin{pmatrix} h_i^1 \\ h_i^2 \end{pmatrix}_{2L_h*1}.$$

Rewrite the received signal:

$$y' = \sum_{i=1}^{M} D' x_i F'' \sqrt{D'_P}\, h'_i + n.$$

For correlation of the channel, assume the same tap of the two slots are correlated with the same correlation r and different taps are uncorrelated.

$$r = J_0(2\pi f_d \tau)(\text{Rayleigh fading}), \quad R_{hh} = E(h'_i h'^H_i) = \begin{pmatrix} I_{L_h} & r \cdot I_{L_h} \\ r \cdot I_{L_h} & I_{L_h} \end{pmatrix}.$$

For the special case r=1: the same as before; r=0: assume two channels are different.

The MMSE estimation for both channels in two slots are:

$$\overline{h}'_i = \sqrt{D'_P}\, R_{hh} (D' x_i F'' \sqrt{D'_P})^H$$

$$\left( \sum_{j=1}^{M} D' x_j F'' \sqrt{D'_P}\, R_{hh} (D' x_j F'' \sqrt{D'_P})^H + N_0 I \right)^{-1} y' =$$

$$D'_P R_{hh} (D' x_i F'')^H \left( \sum_{j=1}^{M} D' x_j F'' D'_P R_{hh} (D' x_j F'')^H + N_0 I \right)^{-1} y'$$

A performance loss of channel estimation using proposed long sequence design with 96 pilot sequence pool is shown in the table below:

TABLE 2

| QPSK, rate ½, same PSD | UMA | UMI | PB |
|---|---|---|---|
| 12UE, 96 pilot sequence pool | 2.8 | 2.0 | 1.9 |
| 6UE, 96 pilot sequence pool | 1.1 | 0.8 | 0.8 |

Figure 19:
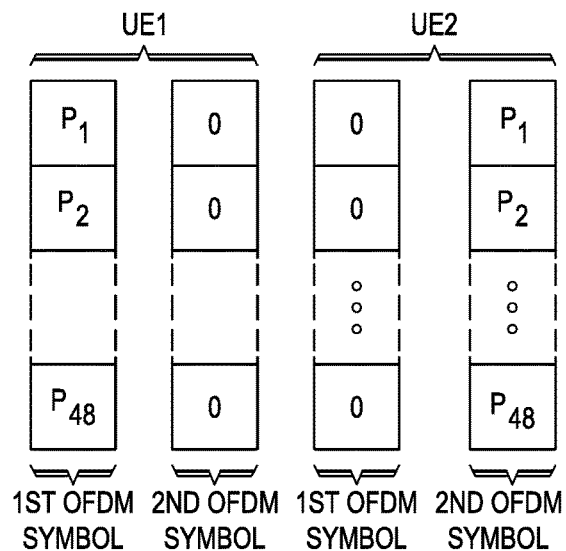
FIG. 19 is a diagram of an embodiment scheme for transmitting pilot sequences over an uplink frame.

In some embodiment, UEs transmit a pilot sequence over different OFDM symbols of an uplink frame FIG. 19 is a diagram of a scheme for transmitting pilot sequences over an uplink frame. As shown, UE1 transmits a pilot sequence ($P_1$, $P_2$, ... $P_{48}$) over a first OFDM symbol of an uplink frame, and zeros over a second OFDM symbol of a uplink frame and UE2 transmits the pilot sequence ($P_1$, $P_2$, ... $P_{48}$) over a second OFDM symbol of the uplink frame and zeros over a first OFDM symbol of a uplink frame. Therefore, there is no mutual interference between pilot signals of UE1 and UE2 when they transmit their signals over the same time-frequency resources.

In this example, a base station receives an uplink frame carrying a pilot sequence transmission by UE1 and a pilot sequence transmission by UE2. Pilot values in the pilot sequence transmission of UE1 are received over a different orthogonal frequency division multiplexed (OFDM) symbol than pilot values of the pilot sequence transmission of UE2. In some embodiments, UE1 transmits zero-power signals over sub-band frequencies in an OFDM symbol (e.g., symbol 2) that carry pilot values transmitted by UE2, and UE2 transmits zero-power signals over sub-band frequencies in an OFDM symbol (OFDM symbol 2) that carry pilot values transmitted by UE1. Other examples are also possible.

Figure 20:
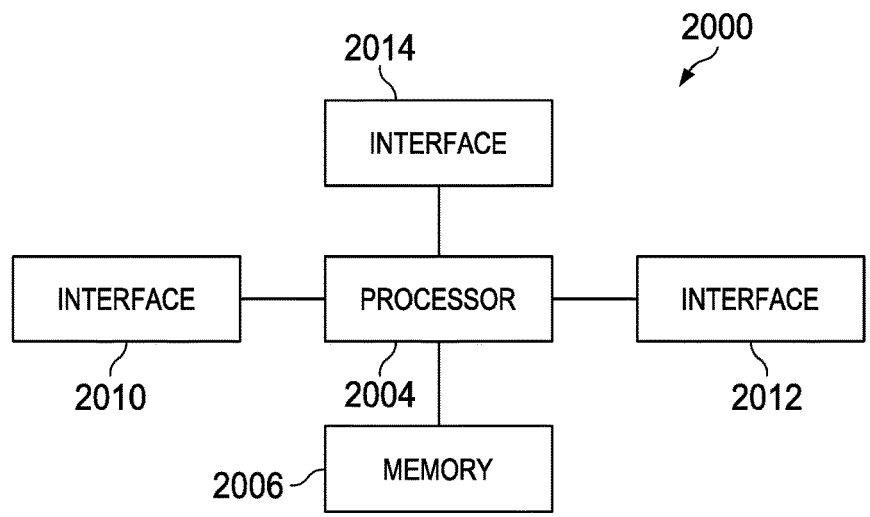
FIG. 20 illustrates a diagram of an embodiment processing system.

FIG. 20 is a block diagram of an embodiment processing system 2000 for performing methods described herein, which may be installed in a host device. As shown, the processing system 2000 includes a processor 2004, a memory 2006, and interfaces 2010-2014, which may (or may not) be arranged as shown in the figure. The processor 2004 may be any component or collection of components adapted to perform computations and/or other processing related tasks, and the memory 2006 may be any component or collection of components adapted to store programming and/or instructions for execution by the processor 2004. In an embodiment, the memory 2006 includes a non-transitory computer readable medium. The interfaces 2010, 2012, 2014 may be any component or collection of components that allow the processing system 2000 to communicate with other devices/components and/or a UE. For example, one or more of the interfaces 2010, 2012, 2014 may be adapted to communicate data, control, or management messages from the processor 2004 to applications installed on the host device and/or a remote device. As another example, one or more of the interfaces 2010, 2012, 2014 may be adapted to allow a user or user device (e.g., personal computer (PC), etc.) to interact/communicate with the processing system 2000. The processing system 2000 may include additional components not depicted in the figure, such as long term storage (e.g., non-volatile memory, etc.).

In some embodiments, the processing system 2000 is included in a network device that is accessing, or part otherwise of, a telecommunications network. In one example, the processing system 2000 is in a network-side device in a wireless or wireline telecommunications network, such as a base station, a relay station, a scheduler, a controller, a gateway, a router, an applications server, or any other device in the telecommunications network. In other embodiments, the processing system 2000 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 21:
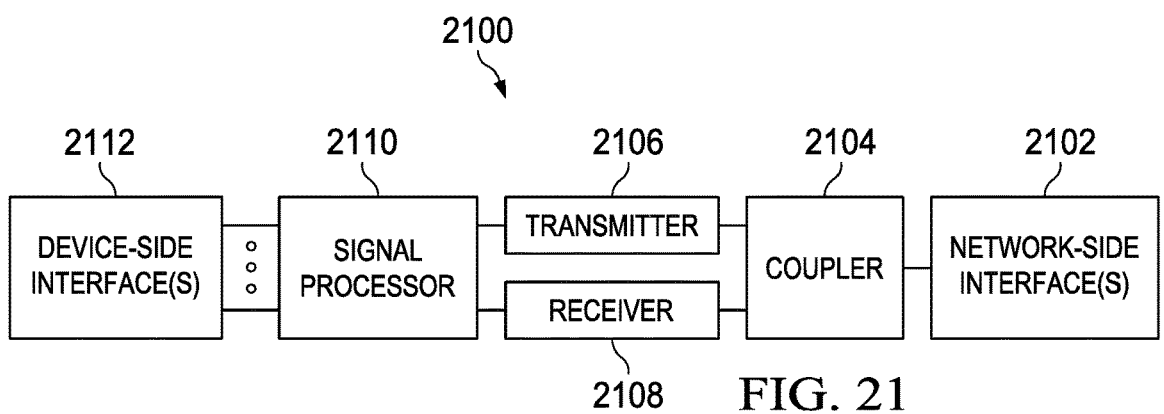
FIG. 21 illustrates a diagram of an embodiment transceiver.

In some embodiments, one or more of the interfaces 2010, 2012, 2014 connects the processing system 2000 to a transceiver adapted to transmit and receive signaling over the telecommunications network. FIG. 21 is a block diagram of a transceiver 2100 adapted to transmit and receive signaling over a telecommunications network. The transceiver 2100 may be installed in a host device. As shown, the transceiver 2100 comprises a network-side interface 2102, a coupler 2104, a transmitter 2106, a receiver 2108, a signal processor 2110, and a device-side interface 2112. The network-side interface 2102 may include any component or collection of components adapted to transmit or receive signaling over a wireless or wireline telecommunications network. The coupler 2104 may include any component or collection of components adapted to facilitate bi-directional communication over the network-side interface 2102. The transmitter 2106 may include any component or collection of components (e.g., up-converter, power amplifier, etc.) adapted to convert a baseband signal into a modulated carrier signal suitable for transmission over the network-side interface 2102. The receiver 2108 may include any component or collection of components (e.g., down-converter, low noise amplifier, etc.) adapted to convert a carrier signal received over the network-side interface 2102 into a baseband signal. The signal processor 2110 may include any component or collection of components adapted to convert a baseband signal into a data signal suitable for communication over the device-side interface(s) 2112, or vice-versa. The device-side interface(s) 2112 may include any component or collection of components adapted to communicate data-signals between the signal processor 2110 and components within the host device (e.g., the processing system 2000, local area network (LAN) ports, etc.).

The transceiver 2100 may transmit and receive signaling over any type of communications medium. In some embodiments, the transceiver 2100 transmits and receives signaling over a wireless medium. For example, the transceiver 2100 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 2102 comprises one or more antenna/radiating elements. For example, the network-side interface 2102 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 2100 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Although this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for uplink contention-based transmission, the method comprising:
    selecting a pilot sequence from a pool of pilot sequences, the pilot sequence including a sequence of pilot values; and
    transmitting a first subset of pilot values in the sequence of pilot values over a first orthogonal frequency division multiplexed (OFDM) symbol in an uplink frame, and a second, distinct subset of pilot values in the sequence of pilot values over a second OFDM symbol in the uplink frame, a size of the first subset of pilot values being equal to a total number of subcarriers in the first OFDM symbol, the first subset of pilot values determined in accordance with the total number of subcarriers in the first OFDM symbol, the second subset of pilot values determined in accordance with a total number of subcarriers in the second OFDM symbol.

2. The method of claim 1, wherein a first pilot value in the pilot sequence is transmitted over the first OFDM symbol without being transmitted over the second OFDM symbol, and wherein a second pilot value in the pilot sequence is transmitted over the second OFDM symbol without being transmitted over the first OFDM symbol.

3. The method of claim 1, wherein odd pilot values in the pilot sequence are transmitted over the first OFDM symbol without being transmitted over the second OFDM symbol, and wherein even pilot values in the pilot sequence are transmitted over the second OFDM symbol without being transmitted over the first OFDM symbol.

4. The method of claim 1, wherein the sequence of pilot values consists of a leading subset of consecutive pilot values and a trailing subset of consecutive pilot values, and wherein pilot values in the leading subset of consecutive pilot values are transmitted over the first OFDM symbol without being transmitted over the second OFDM symbol, and wherein pilot values in the trailing subset of consecutive pilot values are transmitted over the second OFDM symbol without being transmitted over the first OFDM symbol.

5. The method of claim 4, wherein a first pilot value in the leading subset of consecutive pilot values is transmitted over the same subcarrier as a first pilot value in the trailing subset of consecutive pilot values, the first pilot value in the leading subset of consecutive pilot values preceding every second pilot value in the leading subset of consecutive pilot values, and the first pilot value in the trailing subset of consecutive pilot values preceding every second pilot value in the trailing subset of consecutive pilot values.

6. The method of claim 4, wherein a first pilot value in the leading subset of consecutive pilot values is transmitted over the same subcarrier as a last pilot value in the trailing subset of consecutive pilot values, the first pilot value in the leading subset of consecutive pilot values preceding every second pilot value in the leading subset of consecutive pilot values, and the last pilot value in the trailing subset of consecutive pilot values being preceded by every second pilot value in the trailing subset of consecutive pilot values.

7. The method of claim 1, wherein the sequence of pilot values consists of a leading subset of consecutive pilot values and a trailing subset of consecutive pilot values, and wherein pilot values in the leading subset of consecutive pilot values are transmitted in the same OFDM symbol as one another, and wherein pilot values in the trailing subset of consecutive pilot values are transmitted in different OFDM symbols than one another.

8. The method of claim 1, wherein all pilot values in the sequence of pilot values are transmitted over consecutive OFDM symbols of the uplink frame.

9. The method of claim 8, wherein the consecutive OFDM symbols over which the sequence of pilot values are transmitted precede all other OFDM symbols in the uplink frame.

10. The method of claim 1, wherein at least some pilot values in the sequence of pilot values are transmitted in non-consecutive OFDM symbols of the uplink frame.

11. The method of claim 1, wherein user equipments (UEs) in a group of UEs randomly select pilot sequences from the pool of pilot sequences when accessing the uplink frame according to a grant-free access scheme.

12. The method of claim 11, wherein all pilot sequences in the pool of pilot sequences have zero cross-correlation with one another.

13. The method of claim 12, the pool of pilot sequences consists of ZC sequences having the same root but different cyclic shifts.

14. The method of claim 11, wherein the pool of pilot sequences includes at least two pilot sequences that have non-zero cross-correlation with one another.

15. The method of claim 14, the at least two pilot sequences are ZC sequences having different roots.

16. An apparatus comprising:
a processor; and
a non-transitory computer readable storage medium storing programming for execution by the processor, the programming including instructions to:
select a pilot sequence from a pool of pilot sequences, the pilot sequence including a sequence of pilot values; and
transmit a first subset of pilot values in the sequence of pilot values over a first orthogonal frequency division multiplexed (OFDM) symbol in an uplink frame, and a second, distinct subset of pilot values in the sequence of pilot values over a second OFDM symbol in the uplink frame, a size of the first subset of pilot values being equal to a total number of subcarriers in the first OFDM symbol, the first subset of pilot values determined in accordance with the total number of subcarriers in the first OFDM symbol, the second subset of pilot values determined in accordance with a total number of subcarriers in the second OFDM symbol.

17. The apparatus of claim 16, wherein a first pilot value in the pilot sequence is transmitted over the first OFDM symbol without being transmitted over the second OFDM symbol, and wherein a second pilot value in the pilot sequence is transmitted over the second OFDM symbol without being transmitted over the first OFDM symbol.

18. The apparatus of claim 16, wherein odd pilot values in the pilot sequence are transmitted over the first OFDM symbol without being transmitted over the second OFDM symbol, and wherein even pilot values in the pilot sequence are transmitted over the second OFDM symbol without being transmitted over the first OFDM symbol.

19. The apparatus of claim 16, wherein the sequence of pilot values consists of a leading subset of consecutive pilot values and a trailing subset of consecutive pilot values, and wherein pilot values in the leading subset of consecutive pilot values are transmitted over the first OFDM symbol without being transmitted over the second OFDM symbol, and wherein pilot values in the trailing subset of consecutive pilot values are transmitted over the second OFDM symbol without being transmitted over the first OFDM symbol.

20. A method for uplink contention-based transmission, the method comprising:
transmitting consecutive pilot values of a first pilot sequence over consecutive subcarriers in a first orthogonal frequency division multiplexed (OFDM) symbol of an uplink frame;
applying a same phase shift to every second pilot value in the first pilot sequence to obtain a phase-shifted pilot sequence; and
transmitting consecutive pilot values in the phase-shifted pilot sequence over the consecutive subcarriers in a second OFDM symbol of the uplink frame.

21. The method of claim 20, wherein odd pilot values in the phase-shifted pilot sequence have the same phase as corresponding odd pilot values in the first pilot sequence, and wherein even pilot values in the phase-shifted pilot sequence have a different phase than corresponding even pilot values in the first pilot sequence.

22. The method of claim 20, wherein even pilot values in the phase-shifted pilot sequence have the same phase as corresponding even pilot values in the first pilot sequence, and wherein odd pilot values in the phase-shifted pilot sequence have a different phase than corresponding odd pilot values in the first pilot sequence.

23. An apparatus comprising:
a processor; and
a non-transitory computer readable storage medium storing programming for execution by the processor, the programming including instructions to:
transmit consecutive pilot values of a pilot sequence over consecutive subcarriers in a first orthogonal frequency division multiplexed (OFDM) symbol of an uplink frame;
apply a same phase shift to every second pilot value in the pilot sequence to obtain a phase-shifted pilot sequence; and
transmit consecutive pilot values in the phase-shifted pilot sequence over the consecutive subcarriers in a second OFDM symbol of the uplink frame.

24. A method comprising:
receiving, by a base station, an uplink frame carrying a first pilot sequence transmission by a first user equipment (UE) and a second pilot sequence transmission by a second UE, the first pilot sequence transmission received over a first orthogonal frequency division multiplexed (OFDM) symbol in the uplink frame and a second OFDM symbol in the uplink frame, a first subset of the first pilot sequence transmission received over the first OFDM symbol and determined in accordance with a total number of subcarriers of the first OFDM symbol, a second subset of the first pilot sequence transmission received over the second OFDM symbol and determined in accordance with a total number of subcarriers of the second OFDM symbol, the second pilot sequence transmission received over the first OFDM symbol and the second OFDM symbol, wherein the base station receives zero-power pilot signals from the first UE over subcarriers in the first OFDM symbol that carry pilot values transmitted by the second UE.

25. The method of claim 24, wherein the base station receives zero-power pilot signals from the second UE over subcarriers in the first OFDM symbol that carry pilot values transmitted by the first UE.

26. The method of claim 24, wherein the first pilot sequence transmission includes a first subset of pilot values received over the first OFDM symbol, wherein the second pilot sequence transmission includes a second subset of pilot values received over the first OFDM symbol, and wherein pilot values in the first subset of pilot values are received over different subcarriers than pilot values in the second subset of pilot values.

27. The method of claim 26, wherein pilot values in the first subset of pilot values are received over even subcarriers of the first OFDM symbol, and wherein pilot values in the second subset of pilot values are received over odd subcarriers of the first OFDM symbol.

28. The method of claim 26, wherein the first pilot sequence transmission includes a third subset of pilot values received over a second OFDM symbol, wherein the second pilot sequence transmission includes a fourth subset of pilot values received over the second OFDM symbol, and wherein pilot values in the third subset of pilot values are received over different subcarriers than pilot values in the fourth subset of pilot values.

29. The method of claim 28, wherein pilot values in the first subset of pilot values are received over even subcarriers of the first OFDM symbol, and wherein pilot values in the third subset of pilot values are received over odd subcarriers of the second OFDM symbol.

30. The method of claim 29, wherein pilot values in the second subset of pilot values are received over subcarriers of the first OFDM symbol, and wherein pilot values in the fourth subset of pilot values are received over even subcarriers of the second OFDM symbol.

31. A method comprising:
  transmitting, by a user equipment (UE), data values over a subset of subcarriers in an uplink frame, the subset of subcarriers including a first group of subcarriers and a second group of subcarriers; and
  transmitting, by the UE, a first subset of pilot values in a pilot sequence over the first group of subcarriers in a first orthogonal frequency division multiplexed (OFDM) symbol of the uplink frame and a second subset of pilot values in the pilot sequence over the second group of subcarriers in a second OFDM symbol of the uplink frame, the first group of subcarriers and the second group of subcarriers being non-overlapping.

32. The method of claim 31, wherein
  the UE transmits zero-power signals over the first group of subcarriers during the second OFDM symbol and over the second group of subcarriers during the first OFDM symbol.

33. The method of claim 31, wherein pilot values in the pilot sequence are transmitted over the subset of subcarriers carrying the data values without being transmitted over subcarriers that are excluded from the subset of subcarriers carrying the data values.

* * * * *